US012638079B1

(12) United States Patent

Nelson

(10) Patent No.: US 12,638,079 B1

(45) Date of Patent: May 26, 2026

(54) ELECTRIC AXLE PARKING MECHANISM WITH OIL DAM FOR STABLE OIL LEVEL DURING UPHILL/DOWNHILL DRIVING

(71) Applicant: Schaeffler Technologies AG & Co. KG, Herzogenaurach (DE)

(72) Inventor: Kyle Nelson, Delaware, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 19/170,704

(22) Filed: Apr. 4, 2025

(51) Int. Cl.
| | |
|---|---|
| *F16H 63/34* | (2006.01) |
| *B60K 1/00* | (2006.01) |
| *B60T 1/00* | (2006.01) |
| *F16H 57/04* | (2010.01) |
| *H02K 7/00* | (2006.01) |
| *H02K 9/19* | (2006.01) |

(52) U.S. Cl.
CPC ........... *F16H 63/3425* (2013.01); *B60K 1/00* (2013.01); *B60T 1/005* (2013.01); *F16H 57/0424* (2013.01); *F16H 57/0443* (2013.01); *F16H 57/0476* (2013.01); *H02K 7/006* (2013.01); *H02K 9/19* (2013.01); *B60K 2001/001* (2013.01); *B60K 2001/006* (2013.01)

(58) Field of Classification Search
CPC ..... F16H 63/3425; F16H 2057/020304; F16H 2057/02052; F16H 57/0424; F16H 57/0443; F16H 57/0454; F16H 57/0476; H02K 5/203; H02K 7/006; H02K 7/10;

H02K 7/116; H02K 9/19; B60K 1/00; B60K 2001/001; B60K 2001/006; B60K 11/02; B60T 1/005; B60T 1/062
See application file for complete search history.

(56) References Cited

U.S. PATENT DOCUMENTS

| | | | |
|---|---|---|---|
| 2019/0178365 A1* | 6/2019 | Ishikawa | ............. F16H 57/0424 |
| 2023/0387755 A1 | 11/2023 | Nelson et al. | |
| 2024/0030774 A1 | 1/2024 | Chapanar et al. | |
| 2024/0258869 A1 | 8/2024 | Podschwadt | |
| 2024/0266903 A1 | 8/2024 | Kinion et al. | |
| 2024/0372439 A1 | 11/2024 | Linton et al. | |

FOREIGN PATENT DOCUMENTS

| | | | | |
|---|---|---|---|---|
| CN | 114423971 A | * | 4/2022 | ........... F16H 57/027 |
| DE | 102017123079 A1 | | 4/2019 | |
| WO | 2018145696 A1 | | 8/2018 | |
| WO | 2019169629 A1 | | 9/2019 | |
| WO | 2021069024 A1 | | 4/2021 | |
| WO | 2024027867 A1 | | 2/2024 | |

* cited by examiner

*Primary Examiner* — Richard M Lorence

(74) *Attorney, Agent, or Firm* — Suiter Swantz IP

(57) ABSTRACT

A park mechanism in an electric drive unit may relocate an oil passage within an end housing and add a sensor dam. The sensor dam may separate a park mechanism cavity and a sensor cavity. The sensor dam may trap oil in the park mechanism cavity and prevent the sensor cavity from filling with the oil. The oil may trap the air above the oil in the sensor cavity, preventing the oil from reaching a height of a manual shaft. Thus, a seal of the manual shaft may be prevented from being submerged in the oil.

20 Claims, 16 Drawing Sheets

SECTION A-A

100

200

212

206

217

202

208

204

100

200

ELECTRIC AXLE PARKING MECHANISM WITH OIL DAM FOR STABLE OIL LEVEL DURING UPHILL/DOWNHILL DRIVING

TECHNICAL FIELD

The present disclosure generally relates to locking or disabling mechanisms, and more particularly, to the control of lubricant levels in the mechanisms.

BACKGROUND

Challenges are presented due to oil management and migration of oil during uphill/downhill driving events. Cavities of a park unit of an electric drive unit may affect the flow of oil to a rotor shaft of the electric drive unit during flat grade, uphill, and downhill driving. The uphill driving may starve the flow of oil to the rotor shaft and the downhill driving may flood the rotor shaft with the oil. Therefore, it would be advantageous to provide a device, system, and method that cures the shortcomings described above.

SUMMARY

A park unit is described, in accordance with one or more embodiments of the present disclosure. The park unit may include: a park actuator; an end housing; a cover, wherein the cover seals against the end housing, wherein the end housing and the cover define a sensor cavity, a park mechanism cavity, a sensor dam, and a rotor cavity, wherein the sensor cavity is disposed adjacent to the park mechanism cavity with the sensor dam disposed therebetween, wherein the sensor dam defines a slot, wherein the slot is an only fluid inlet to and fluid outlet from the sensor cavity, wherein the sensor dam is configured to trap air above oil in the sensor cavity, wherein a rotor shaft inlet is disposed within the rotor cavity, wherein the rotor shaft inlet vents the park mechanism cavity; and a park mechanism including an actuator rod and a park lock pawl, wherein the actuator rod is disposed in the sensor cavity, the park mechanism cavity, and the slot, wherein the park lock pawl is disposed in the park mechanism cavity, wherein the park actuator is configured to lock and unlock the park mechanism using the actuator rod and the park lock pawl, wherein linear translation of the actuator rod causes the park lock pawl to rotate relative to the end housing thereby locking and unlocking the park mechanism, wherein the oil is configured to flow along the actuator rod between the sensor cavity and the park mechanism cavity.

In some aspects, the park unit may include a park sensor, wherein the park sensor is disposed in the sensor cavity, wherein the park sensor is configured to sense the park mechanism is locked and unlocked.

In some aspects, the slot and the actuator rod form one of a prismatic joint or a cylindrical joint, wherein the park lock pawl and the end housing form a revolute joint in the park mechanism cavity.

In some aspects, the park unit may include a shaft-sensor stator, wherein the shaft-sensor stator is disposed radially outwards of and axially aligned with the rotor shaft inlet.

In some aspects, the sensor dam includes an inner dam face, an upper dam face, and a lower dam face, wherein the cover includes a cover face, wherein the inner dam face, the upper dam face, the lower dam face, and the cover face define the slot, wherein the upper dam face and the lower dam face extend between the inner dam face and the cover face.

In some aspects, the slot does not conform to the actuator rod, wherein the slot is a rectangular slot.

In some aspects, the park unit may include a gasket, wherein the gasket seals between the cover and the end housing, wherein the cover face protrudes through the gasket into the slot.

In some aspects, the park unit may include a manual shaft, wherein the park actuator is configured to rotate the manual shaft; a park actuator plate, wherein the manual shaft is rigidly fixed to the park actuator plate such that rotation of the manual shaft rotates the park actuator plate; and a pin, wherein the park actuator plate, the manual shaft, and the pin are disposed in the sensor cavity, wherein the pin couples the actuator rod and the park actuator plate, wherein rotation of the park actuator plate translates the actuator rod via the pin, wherein the park actuator is configured to lock and unlock the park mechanism using the manual shaft, the park actuator plate, the pin, the actuator rod, and the park lock pawl.

In some aspects, the park unit is configured to maintain the oil in the sensor cavity below the manual shaft and maintain the oil in the rotor cavity at or above the rotor shaft inlet.

In some aspects, the oil and the sensor dam are configured to trap the air in the sensor cavity when the park unit is at a flat grade and a first non-flat grade, wherein the air is not trapped in the sensor cavity when the park unit is at a second non-flat grade, wherein the first non-flat grade is one of an uphill grade or a downhill grade, wherein the second non-flat grade is the other of the uphill grade or the downhill grade.

In some aspects, the sensor dam includes an upper dam face, wherein the air in the sensor cavity is trapped above the upper dam face by the oil when the park unit is at the flat grade and the first non-flat grade.

In some aspects, the rotor shaft inlet and the upper dam face are aligned at a same height when the park unit is at the flat grade, wherein the upper dam face is disposed below the rotor shaft inlet when the park unit is configured at the first non-flat grade.

In some aspects, the end housing defines a rotor dam, wherein the park mechanism cavity is disposed adjacent to the rotor cavity with the rotor dam disposed therebetween, wherein the oil and the rotor dam are configured to trap the air in the park mechanism cavity when the park unit is at the first non-flat grade, wherein the oil and the rotor dam are not configured to trap the air in the park mechanism cavity when the park unit is at the flat grade and the second non-flat grade.

In some aspects, the rotor dam is disposed above the rotor shaft inlet and the upper dam face when the park unit is at the flat grade, wherein the rotor dam is disposed between the upper dam face and the rotor shaft inlet when the park unit is at the first non-flat grade.

In some aspects, the rotor shaft inlet is disposed below the rotor dam when the park unit is at the flat grade and the second non-flat grade.

In some aspects, the actuator rod is configured to linearly translate into the sensor cavity to unlock the park mechanism and is configured to linearly translate into the park mechanism cavity to lock the park mechanism.

In some aspects, the park lock pawl includes a pawl tooth, wherein the park mechanism is locked when the pawl tooth is disposed within the rotor cavity and is unlocked when the pawl tooth is disposed within the park mechanism cavity.

An electric drive unit is described, in accordance with one or more embodiments of the present disclosure. The electric drive unit may include: a park unit including: a park actuator; an end housing; a cover, wherein the cover seals against the end housing, wherein the end housing and the cover define a sensor cavity, a park mechanism cavity, a sensor dam, and a rotor cavity, wherein the sensor cavity is disposed adjacent to the park mechanism cavity with the sensor dam disposed therebetween, wherein the sensor dam defines a slot, wherein the slot is an only fluid inlet to and fluid outlet from the sensor cavity, wherein the sensor dam is configured to trap air above oil in the sensor cavity, wherein a rotor shaft inlet is disposed within the rotor cavity, wherein the rotor shaft inlet vents the park mechanism cavity; and a park mechanism including an actuator rod and a park lock pawl, wherein the actuator rod is disposed in the sensor cavity, the park mechanism cavity, and the slot, wherein the park lock pawl is disposed in the park mechanism cavity, wherein the park actuator is configured to lock and unlock the park mechanism using the actuator rod and the park lock pawl, wherein linear translation of the actuator rod causes the park lock pawl to rotate relative to the end housing thereby locking and unlocking the park mechanism, wherein the oil is configured to flow along the actuator rod between the sensor cavity and the park mechanism cavity; a housing including a motor housing, wherein the end housing is affixed to the motor housing; a stator, wherein the stator is affixed to the motor housing; and a rotating assembly, wherein the rotating assembly includes a park lock gear, a rotor shaft, and a rotor, wherein the park lock gear is configured to lock and unlock the rotating assembly to and from the stator via the park lock pawl.

In some aspects, the electric drive unit may include a heat exchanger, wherein the oil is routed from the heat exchanger to the park unit.

In some aspects, the electric drive unit is a coaxial rotor system, wherein the electric drive unit includes an output shaft, wherein the output shaft is disposed radially inwards of and axially aligned with the rotor shaft, wherein the oil flowing through the park unit exits the rotor shaft inlet into a cavity defined between the rotor shaft and the output shaft.

It is to be understood that both the foregoing general description and the following detailed description are exemplary and explanatory only and are not necessarily restrictive of the present disclosure. The accompanying drawings, which are incorporated in and constitute a part of the specification, illustrate subject matter of the disclosure. Together, the description and drawings serve to explain the principles of the disclosure.

BRIEF DESCRIPTION OF THE DRAWINGS

The numerous advantages of the disclosure may be better understood by those skilled in the art by reference to the accompanying figures in which.

DETAILED DESCRIPTION

Figure 1A:
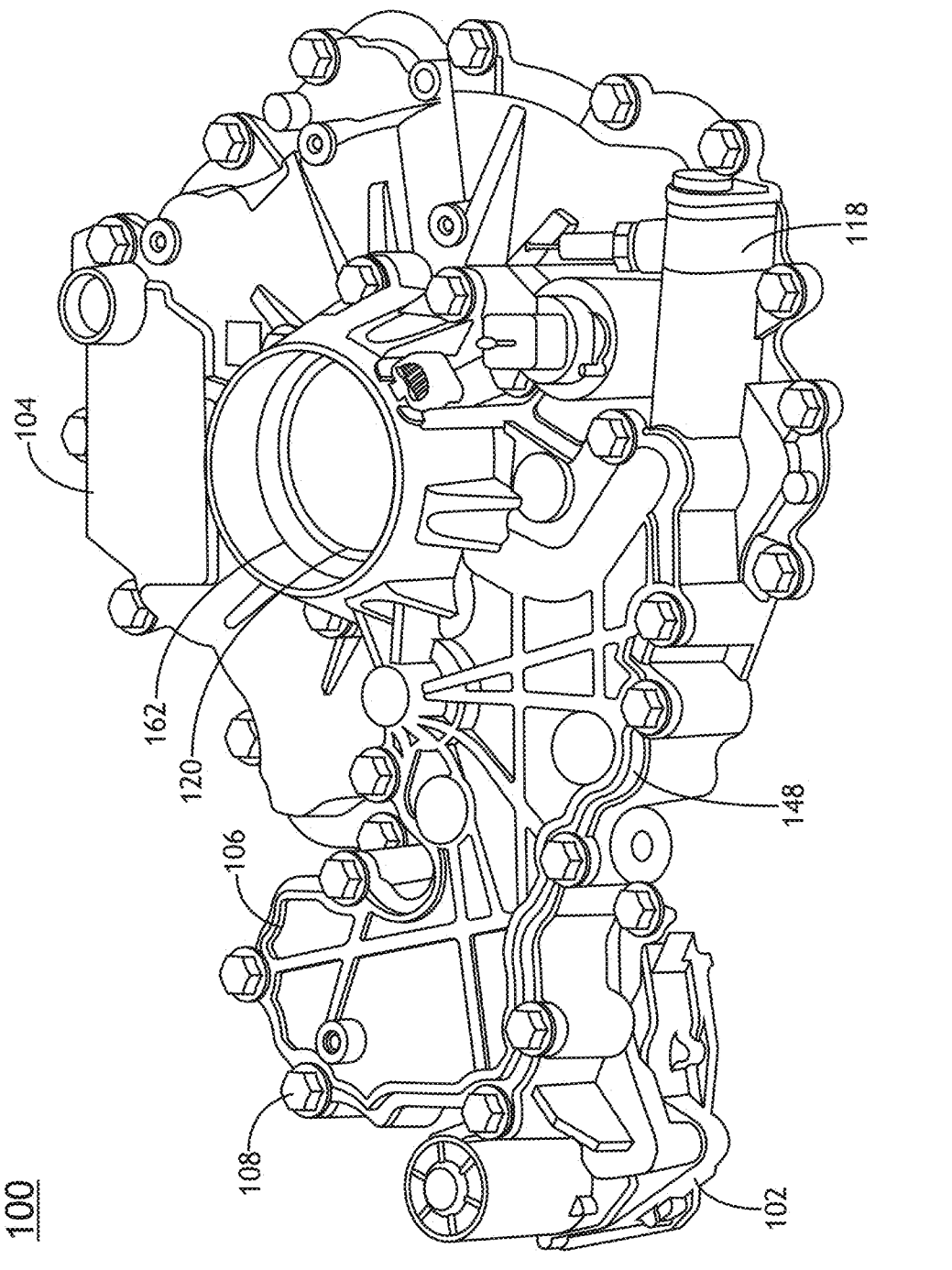
FIG. 1A illustrates a front perspective view of a park unit, in accordance with one or more embodiments of the present disclosure.
Figure 1B:
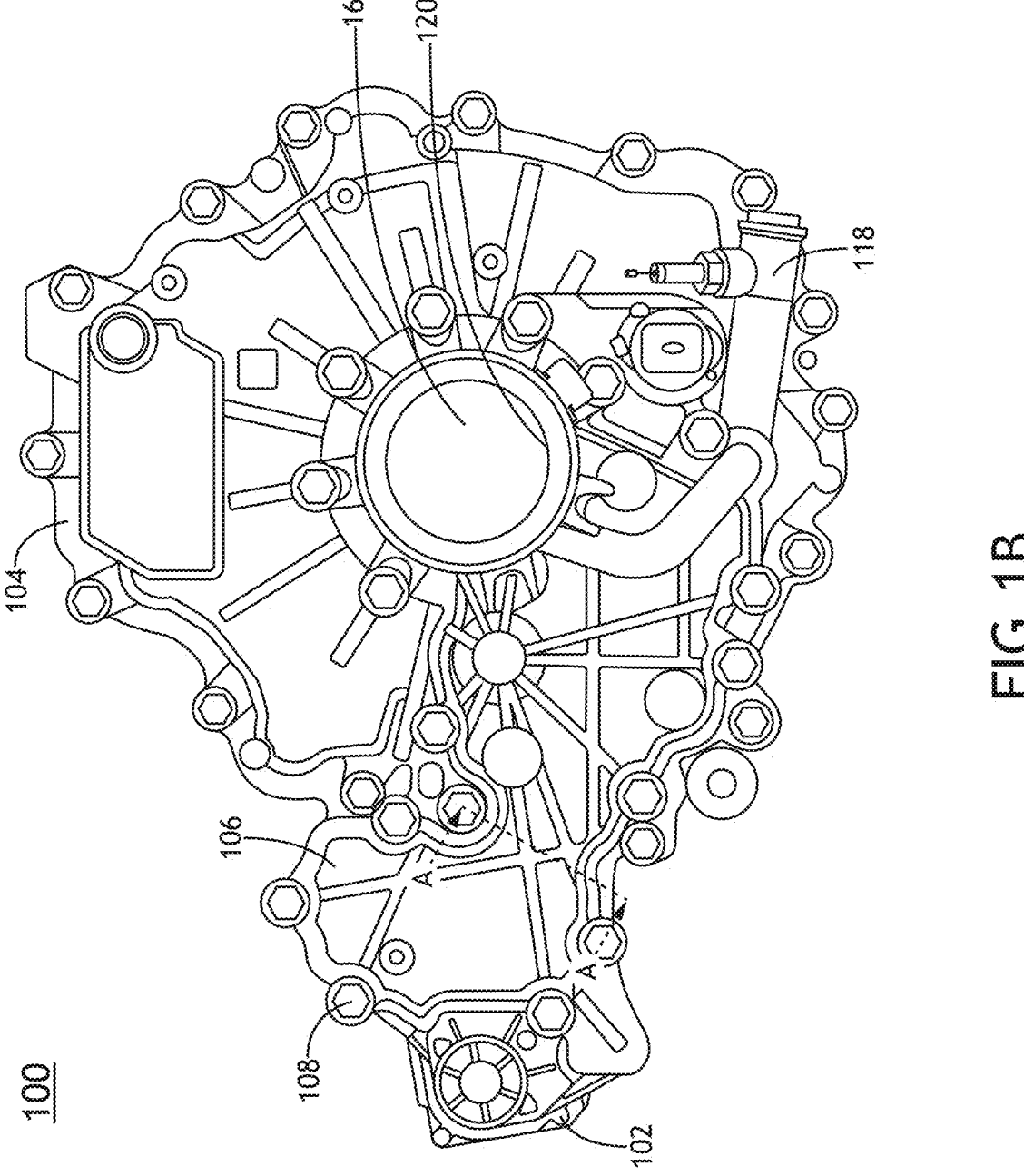
FIG. 1B illustrates a front view of the park unit, in accordance with one or more embodiments of the present disclosure.
Figure 1C:
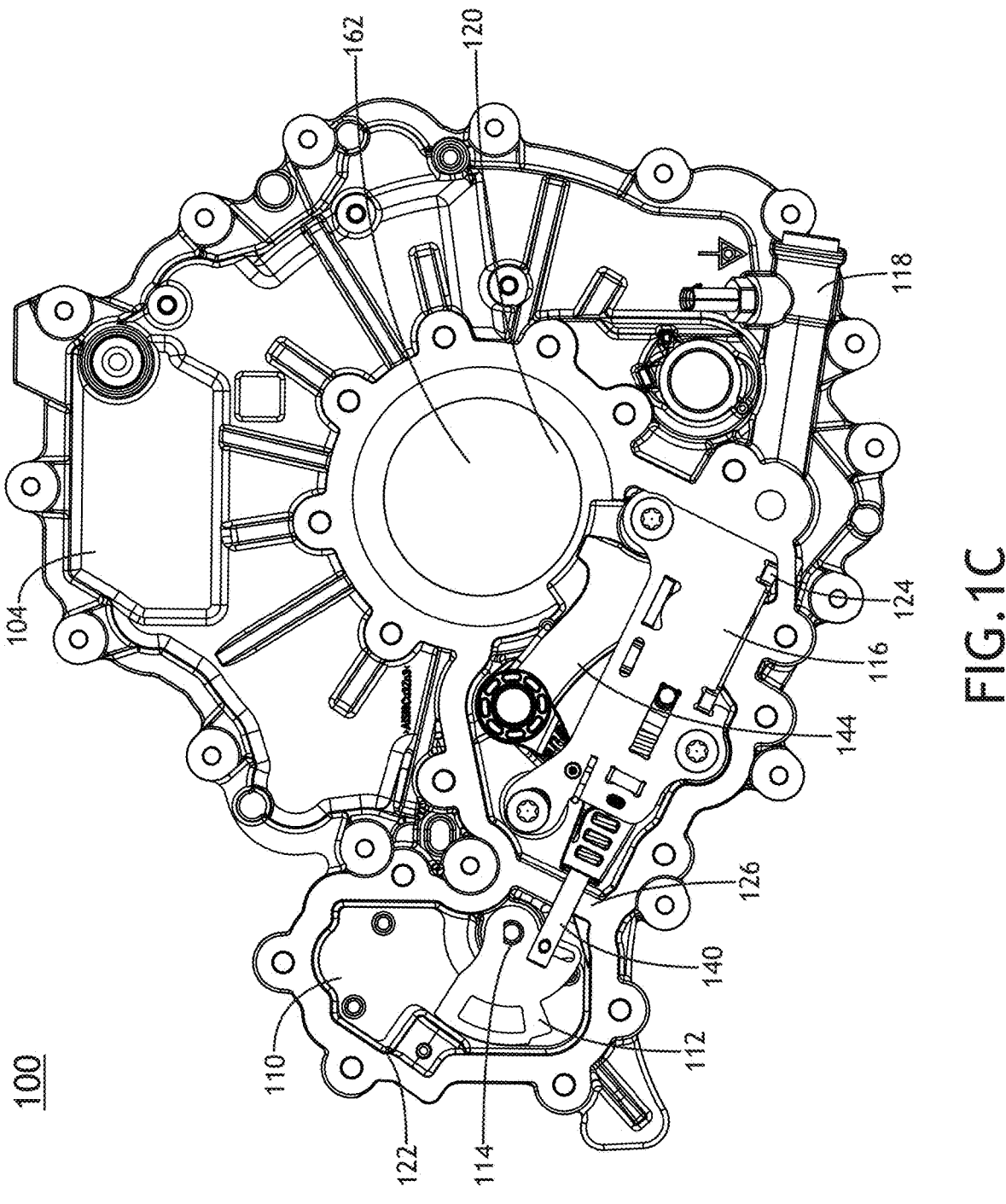
FIG. 1C illustrates a front view of the park unit with a cover removed, in accordance with one or more embodiments of the present disclosure.
Figure 1D:
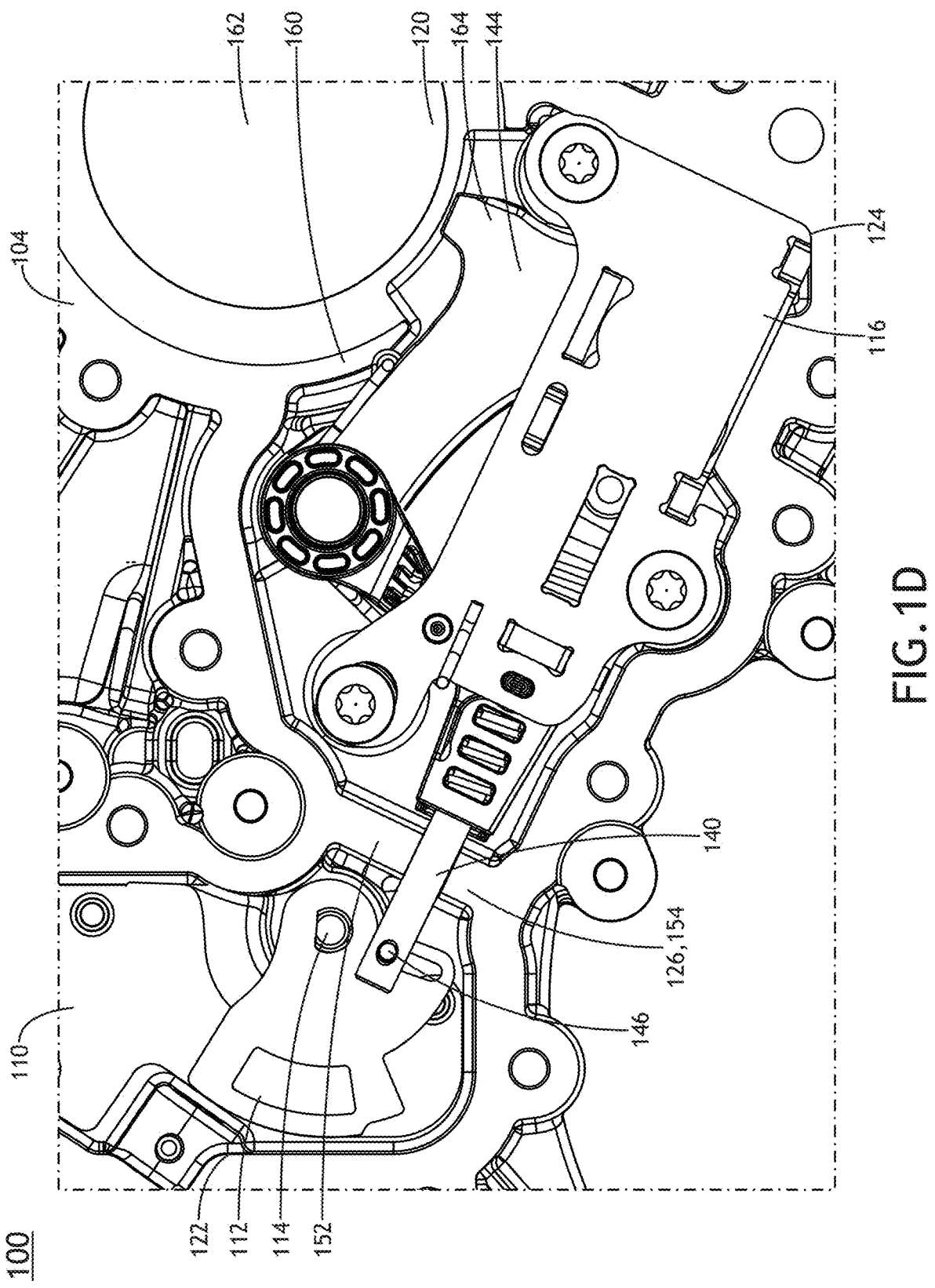
FIG. 1D illustrates a partial front view of the park unit with the cover removed and the parking mechanism in an unlocked configuration, in accordance with one or more embodiments of the present disclosure.
Figure 1E:
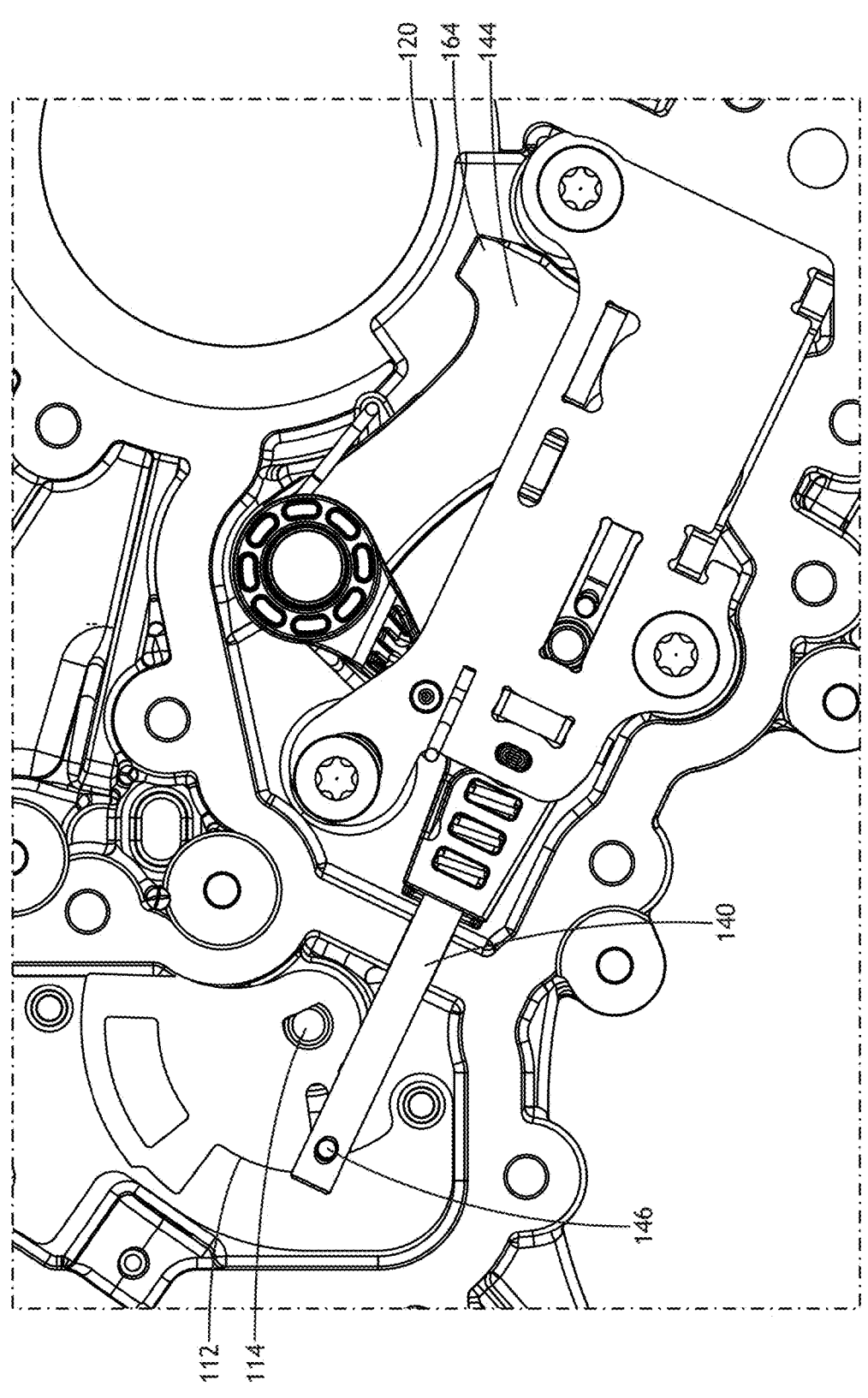
FIG. 1E illustrates a partial front view of the park unit with the cover removed and the parking mechanism in a locked configuration, in accordance with one or more embodiments of the present disclosure.
Figure 1F:
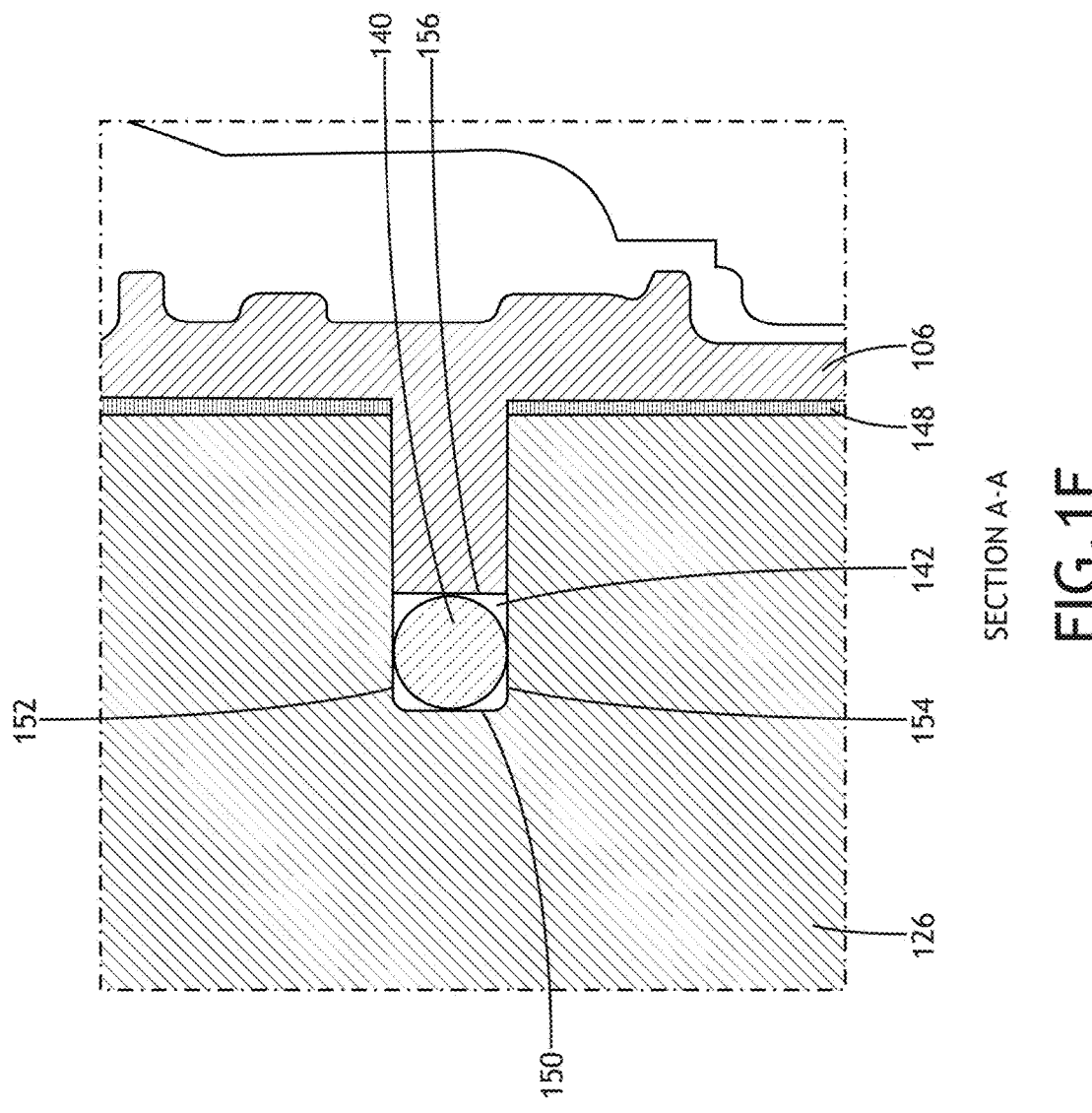
FIG. 1F illustrates a section view through a sensor dam of the park unit, in accordance with one or more embodiments of the present disclosure.

Embodiments of the present disclosure are described herein. It is to be understood, however, that the disclosed embodiments are merely examples and other embodiments can take various and alternative forms. The figures are not necessarily to scale; some features could be exaggerated or minimized to show details of components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Embodiments of the present disclosure are directed to an electric axle parking mechanism with an oil dam for stable oil level during uphill/downhill driving. A park mechanism in an electric drive unit may relocate an oil passage within an end housing and add a sensor dam. The sensor dam may separate a park mechanism cavity and a sensor cavity. The sensor dam may trap oil in the park mechanism cavity and prevent the sensor cavity from filling with the oil. The oil may trap the air above the oil in the sensor cavity, preventing the oil from reaching a height of a manual shaft. Thus, a seal of the manual shaft may be prevented from being submerged in the oil.

FIGS. 1A-1J illustrate a park unit 100, in accordance with one or more embodiments of the present disclosure. The park unit 100 may include a park actuator 102, an end housing 104, a cover 106, fasteners 108, a park actuator plate 112, a manual shaft 114, a park mechanism 116, an oil feed passage 118, a rotor shaft inlet 120, a sensor cavity 122, a park mechanism cavity 124, a sensor dam 126, oil 128, a flat-grade oil level 130, a first uphill-grade oil level 132, a second uphill-grade oil level 134, a third uphill-grade oil level 136, a downhill-grade oil level 138, an actuator rod 140, a slot 142, a park lock pawl 144, a pin 146, a gasket 148, an inner dam face 150, a upper dam face 152, a lower dam face 154, a cover face 156, air 158, a rotor dam 160, a rotor cavity 162, a pawl tooth 164, and/or a shaft-sensor stator 166.

The end housing 104 and/or the cover 106 may define the oil feed passage 118, the rotor shaft inlet 120, the sensor cavity 122, the park mechanism cavity 124, the sensor dam 126, the slot 142, the rotor dam 160, and/or the rotor cavity 162. The sensor cavity 122 may be disposed adjacent to the park mechanism cavity 124 with the sensor dam 126 disposed therebetween. The park mechanism cavity 124 may be disposed adjacent to the rotor cavity 162 with the rotor dam 160 disposed therebetween.

The cover 106 may seal against the end housing 104. The cover 106 may cover one or more components of the park unit 100. For example, the cover 106 may cover the sensor cavity 122 and/or the park mechanism cavity 124, together with the components disposed therein. The cover 106 may or may not cover the rotor cavity 162. The cover 106 may be affixed to the end housing 104. For example, the cover 106 may be affixed to the end housing 104 with the fasteners 108. The fasteners 108 may include, but are not limited to, bolts, rivets, or the like.

The sensor cavity 122, the park mechanism cavity 124, and/or the rotor cavity 162 may contain one or more components of the park unit 100. For example, the park sensor 110, the park actuator plate 112, the manual shaft 114, a portion of the actuator rod 140, and/or the pin 146 may be disposed in the sensor cavity 122. By way of another example, the park mechanism 116, a portion of the actuator rod 140, the park lock pawl 144, and/or the pawl tooth 164 may be disposed in the park mechanism cavity 124. In this regard, the park mechanism cavity 124 may contain the bulk of the park mechanism 116. By way of another example, the rotor shaft inlet 120, the pawl tooth 164, and/or the shaft-sensor stator 166 may be disposed within the rotor cavity 162.

The park actuator 102 may be configured to lock (see FIG. 1D) and unlock (see FIG. 1E) the park mechanism 116. The park actuator 102 may lock and unlock the park mechanism 116 using the manual shaft 114, the park actuator plate 112, the pin 146, the actuator rod 140, and/or the park lock pawl 144.

The park actuator 102 may be configured to rotate the manual shaft 114. For example, the park actuator 102 may use a gear set to rotate the manual shaft 114. The manual shaft 114 may be rigidly fixed to the park actuator plate 112. The rotation of the manual shaft 114 may rotate the park actuator plate 112. The park actuator plate 112 may transform the rotary motion into linear motion to engage the park mechanism 116. The pin 146 may couple the actuator rod 140 and the park actuator plate 112. The pin 146 may form a revolute joint with the actuator rod 140 and/or the park actuator plate 112. The revolute joint may refer to a 1-degree of freedom joint which may permit rotation about the center axis but prevents other rotation and/or translation. The rotation of the park actuator plate 112 may translate the actuator rod 140 via the pin 146.

The park mechanism 116 may also be referred to as a park lock mechanism. The park mechanism 116 may include the actuator rod 140 and/or the park lock pawl 144. The actuator rod 140 may be disposed in the sensor cavity 122, the park mechanism cavity 124, and/or the slot 142.

The actuator rod 140 may translate the rotary motion into linear motion to actuate the park lock pawl 144. The actuator rod 140 may be linearly translated further into the sensor cavity 122 from the park mechanism cavity 124 to unlock the park mechanism 116 and/or may be linearly translated further into the park mechanism cavity 124 from the sensor cavity 122 to lock the park mechanism 116.

The park lock pawl 144 may be configured to rotate relative to the end housing 104. For example, the park lock pawl 144 and the end housing 104 may form a revolute joint. The revolute joint between the park lock pawl 144 and the end housing 104 may be disposed in the park mechanism cavity 124. The linear translation of the actuator rod 140 may cause the park lock pawl 144 to rotate relative to the end housing 104. For example, the park mechanism 116 may include rollers (not depicted), which may couple the actuator rod 140 and the park lock pawl 144. The rollers may roll along a profile of the park lock pawl 144 as a cam-follower. The park mechanism 116 may also be spring-loaded to cause the park lock pawl 144 to follow along the rollers. The park mechanism 116 may be locked and unlocked when the park lock pawl 144 is disposed at an unlocked configuration and a locked configuration. The park lock pawl 144 may be rotated from the unlocked configuration into the rotor cavity 162 and radially inwards towards the rotor shaft inlet 120 to the locked configuration. The pawl tooth 164 of the park lock pawl 144 may be disposed within the rotor cavity 162 in the locked configuration. Similarly, the park lock pawl 144 may be rotated from the locked configuration out of the rotor cavity 162 and radially outwards away from the rotor shaft inlet 120 to the unlocked configuration. The pawl tooth 164 of the park lock pawl 144 may be disposed within the park mechanism cavity 124 in the unlocked configuration.

The park sensor 110 may be configured to sense the park mechanism 116 is locked and unlocked. For example, the park sensor 110 may be configured to sense the angle of the park actuator plate 112 relative to the end housing 104 by which the park sensor 110 may sense when the park mechanism 116 is locked and unlocked.

The actuator rod 140 may extend through the sensor dam 126. The actuator rod 140 may extend through the slot 142 between the sensor cavity 122 and the park mechanism cavity 124. The sensor dam 126 may act as a support for the actuator rod 140. The slot 142 and the actuator rod 140 may form a joint, such as, a prismatic joint or a cylindrical joint. The prismatic joint may refer to a 1-degree of freedom joint permitting axial translation but no other translation or rotation. The cylindrical joint may refer to a 2-degree of freedom joint permitting axial translation and rotation about the center axis but no other translation or rotation. The actuator rod 140 may be configured to axially translate relative to the slot 142. The actuator rod 140 may be radially constrained to the slot 142. The slot 142 may act as a metallic bushing for the actuator rod 140. The slot 142 may constrain the radial movement and/or rotation of the actuator rod 140. The rotation of the actuator rod 140 about the center axis of the actuator rod 140 may also be constrained by the pin 146. Thus, the degrees of freedom of the actuator rod 140 other than the axial translation may be constrained via the slot 142.

The sensor dam 126 and the cover 106 may cooperatively define the slot 142. The sensor dam 126 may include the inner dam face 150, the upper dam face 152, and the lower dam face 154. The cover 106 may include the cover face 156. The inner dam face 150, the upper dam face 152, the lower dam face 154, and/or the cover face 156 may cooperatively define the slot 142. The inner dam face 150 and the cover face 156 may be disposed on opposing sides of the actuator rod 140. The inner dam face 150 and the cover face 156 may be an inner groove and an outer groove, respectively, of the slot 142. The upper dam face 152 and the lower dam face 154 may extend between the inner dam face 150 and the cover face 156. The upper dam face 152 and the lower dam face 154 may also be disposed on opposing sides of the actuator rod 140. The upper dam face 152 and the lower dam face 154 may be a top groove and a bottom groove, respectively, of the slot 142. The upper dam face 152 and the lower dam face 154 may be sized such that the cover face 156 may be disposed therebetween. The inner dam face 150, the upper dam face 152, the lower dam face 154, and/or the cover face 156 may radially retain the actuator rod 140.

The sensor cavity 122 and the park mechanism cavity 124 may be fluidically coupled by the slot 142. The park mechanism cavity 124 may be fluidically coupled to the sensor cavity 122 and the rotor cavity 162.

The actuator rod 140 and/or the slot 142 may not seal the sensor cavity 122 from the park mechanism cavity 124. The air 158 and/or the oil 128 may flow along the actuator rod 140 between the sensor cavity 122 and the park mechanism cavity 124. The slot 142 may not conform to the actuator rod 140. For example, the inner dam face 150, the upper dam face 152, the lower dam face 154, and/or the cover face 156 may be shaped to define the slot 142 as a rectangular slot (e.g., a rounded-rectangular slot) with the actuator rod 140 includes a circular cross-section. The air 158 and/or the oil 128 may travel through the slot 142 around the diameter of the actuator rod 140 between the sensor cavity 122 and the park mechanism cavity 124, thereby fluidically coupling the sensor cavity 122 and the park mechanism cavity 124.

The fluidic coupling between the sensor cavity 122 and the park mechanism cavity 124 may promote filling the sensor cavity 122 with the oil 128 and burping the air 158 from the sensor cavity 122 to the park mechanism cavity 124. Burping the air 158 from the sensor cavity 122 to the park mechanism cavity 124 may prevent over-pressurization of the air 158 due to an increase in the temperature of the air 158. During filling/grade changes, the oil 128 may travel through the sensor dam 126 to fill in volume, while trapping the air 158 once a fill height is achieved. When the oil 128 is at the sensor dam 126, the sensor dam 126 may trap the air 158 above the oil 128 in the sensor cavity 122. The air 158 may be trapped at the highest point of the sensor cavity 122 with the oil 128 disposed below the air 158 in the sensor cavity 122.

The air 158 trapped within the sensor cavity 122 may burp (e.g., glug, self-relieve) to the park mechanism cavity 124, due to the sensor dam 126 not having a seal between the sensor cavity 122 and the park mechanism cavity 124. Once the pressure of the air 158 exceeds a hydrostatic pressure of the oil 128, the volume of the air 158 can expand and burp from the sensor cavity 122 into the park mechanism cavity

124. Hydrostatic pressures are very low in single digit to low two-digit millibar (~5-15 mbar), as compared to typical seal pressure limits of 500 millibars for lip seals. For example, if the air 158 heats up and expands, the air 158 will burp through the sensor dam 126 and escape via rotor shaft inlet 120. Therefore, there is no perceived risk of the air 158 which is trapped from blowing through seals of the manual shaft 114 and leaking into the park actuator 102.

The gasket 148 may seal between the cover 106 and the end housing 104. The gasket 148 may bridge across the sensor dam 126 and seal between the sensor cavity 122 and the park mechanism cavity 124, while leaving open the slot 142. The cover face 156 may protrude through the gasket 148 into the slot 142.

The park mechanism cavity 124 and the rotor cavity 162 may be fluidically coupled. For example, the park mechanism cavity 124 and the rotor cavity 162 may be fluidically coupled through the rotor dam 160.

The park mechanism cavity 124 may be vented. For example, the fluid inlet to the park mechanism cavity 124 may be the oil feed passage 118, the fluid outlet from the park mechanism cavity 124 may be the rotor shaft inlet 120. The rotor shaft inlet 120 may vent the park mechanism cavity 124. The end housing 104 and/or the cover 106 may define the oil feed passage 118. The oil 128 may inlet into the park mechanism cavity 124 through the oil feed passage 118. The oil 128 may lubricate the park mechanism 116, the actuator rod 140, and/or the park lock pawl 144 in the park mechanism cavity 124. The oil 128 and/or the air 158 may outlet from the park mechanism cavity 124 into the rotor shaft inlet 120. The oil 128 may outlet from the park mechanism cavity 124 by overflowing from the park mechanism cavity 124 into the rotor shaft inlet 120. The rotor shaft inlet 120 may be a lowest height of a circular hole defined by the rotor cavity 162. The rotor shaft inlet 120 may also be referred to as a park unit outlet. The oil 128 and/or the air 158 may be at atmospheric pressure at the rotor shaft inlet 120, because the oil 128 and/or the air 158 drains to atmosphere.

The sensor cavity 122 may be unvented. For example, the slot 142 may be the only fluid inlet to and fluid outlet from the sensor cavity 122. The oil 128 may come into the sensor cavity 122 through the slot 142. The air 158 in the sensor cavity 122 may be pressurized by the oil 128 in the sensor cavity 122, thereby pushing the oil 128 downwards and preventing the sensor cavity 122 from filling. The oil 128 and/or the sensor dam 126 may trap the air 158 in the sensor cavity 122. The oil 128 may also lubricate the pin 146 in the sensor cavity 122, when the pin 146 is submerged in the oil 128.

Trapping the air 158 in the sensor cavity 122 may enable the sensor dam 126 to maintain a desired level of the oil 128 in the sensor cavity 122, the park mechanism cavity 124, and/or the rotor cavity 162. The park unit 100 may maintain the level of the oil 128 in the sensor cavity 122 below the manual shaft 114, may maintain the level of the oil 128 in the park mechanism cavity 124 at or below the rotor dam 160, and/or may maintain the level of the oil 128 in the rotor cavity 162 at or above the rotor shaft inlet 120 using the sensor dam 126 and/or the rotor dam 160.

The manual shaft 114 may include rotary seals which are disposed above the oil 128 in the sensor cavity 122. The rotary seals may weep the oil 128 to the park actuator 102 if submerged in the oil 128. It is undesirable for the oil 128 to weep into the park actuator 102. Therefore, it is desirable to maintain the top of the oil 128 in the sensor cavity 122 below the manual shaft 114.

Portions of the sensor cavity 122 and/or the park mechanism cavity 124 may fill up with the oil 128 prior to the oil 128 exiting the park mechanism cavity 124 into the rotor shaft inlet 120. The sensor cavity 122 and the park mechanism cavity 124 holding the oil 128 may affect cooling/lubrication performance, due to changes in the level of the oil 128 over grade changes. Due to uphill/downhill driving, gravity may force the oil 128 to move within the sensor cavity 122 and the park mechanism cavity 124. The sensor dam 126 may control the flow of the oil 128 and the air 158 between the sensor cavity 122 and the park mechanism cavity 124 as the park unit 100 experiences the grade changes. The sensor dam 126 may control the movement of the oil 128 during grade changes uphill or downhill. The various components of the park unit 100 may remain unchanged during the grade changes, except for the levels of the air 158 and the oil 128. The levels of the air 158 and the oil 128 may be dynamic and change with the orientation of the park unit 100, the pressure and/or temperature of the air 158, and/or the pressure of the oil 128.

By incorporating the sensor dam 126 and/or the rotor dam 160, the level of the oil 128 due to grade changes may be managed to prevent oil starvation to the rotor shaft inlet 120 and avoid a need to seal off and vent the sensor cavity 122 to prevent seal blowout. The park unit 100 may be configured between an uphill grade, a flat grade, and/or a downhill grade. The sensor dam 126 may manage the level of the oil 128 in the sensor cavity 122 by trapping the air 158 in the sensor cavity 122 at the flat grade and/or the uphill grade. The pressure of the air 158 in the sensor cavity 122 may press downwards against the oil 128 and keep the oil 128 below the manual shaft 114. Thus, the oil 128 may not displace the air 158 and may not fill up the sensor cavity 122.

Figure 1G:
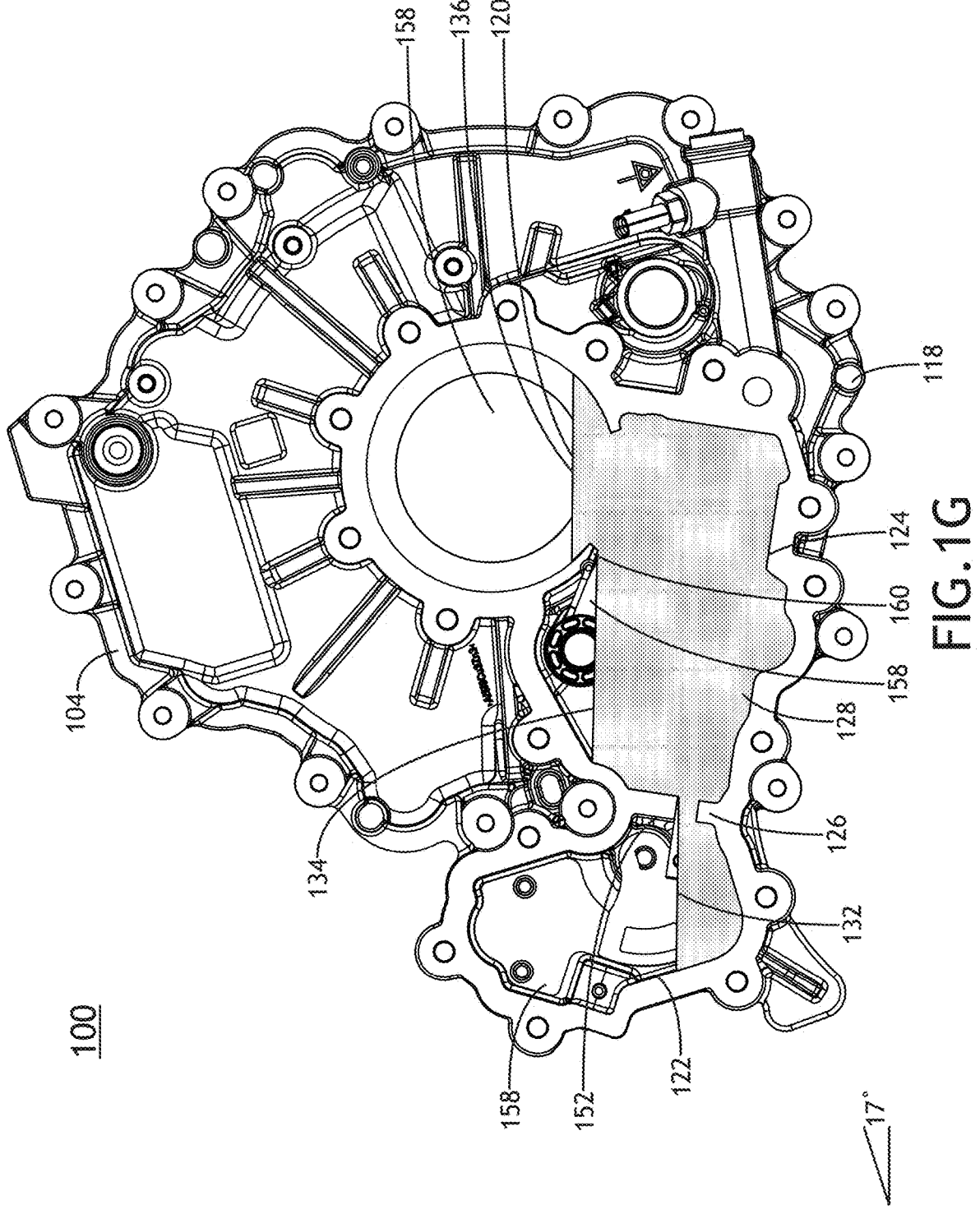
FIG. 1G illustrates a partial front view of the park unit with the cover removed and oil of the park unit configured at an uphill grade, in accordance with one or more embodiments of the present disclosure.
Figure 1H:
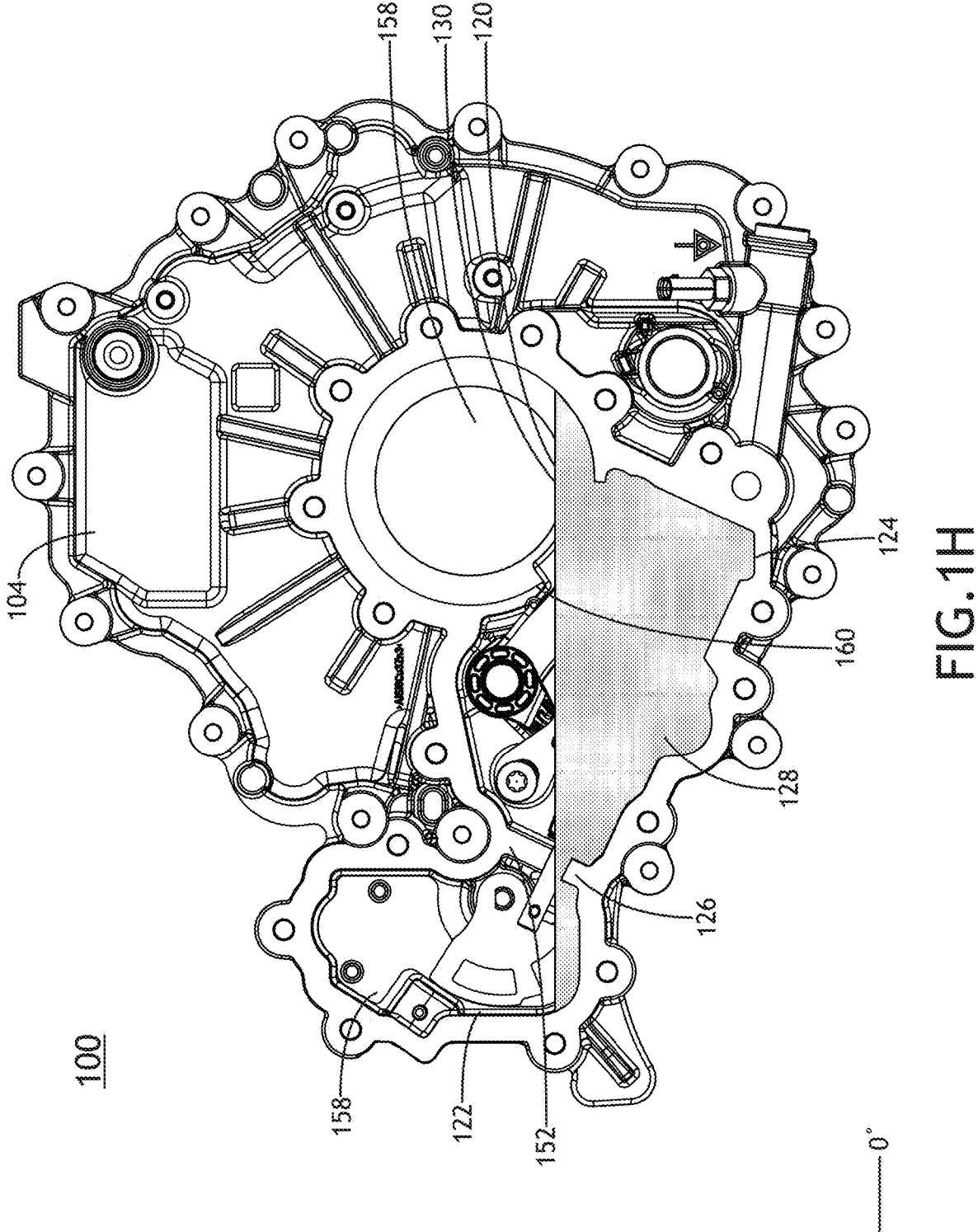
FIG. 1H illustrates a partial front view of the park unit with the cover removed and the oil of the park unit configured at a flat grade, in accordance with one or more embodiments of the present disclosure.

The park unit 100 may be configured at the flat grade (see FIG. 1H). The flat grade may include a 0-degree grade. The rotor shaft inlet 120 and the upper dam face 152 may be aligned at a same height when the park unit 100 is at the flat grade. The oil 128 in the sensor cavity 122, the park mechanism cavity 124, and/or the rotor cavity 162 may be disposed at the flat-grade oil level 130 when the park unit 100 is configured at the flat grade. The flat-grade oil level 130 may also be referred to as a flat-ground oil level. In flat ground operation, the oil 128 will first fill the park mechanism cavity 124 until the height of the oil 128 causes overflow into the rotor shaft inlet 120, setting the flat-grade oil level 130 of the oil 128. The air 158 in the sensor cavity 122 may be trapped above the upper dam face 152 by the oil 128. Due to the placement of the sensor cavity 122, the oil 128 may only fill the very bottom of the sensor cavity 122 until the oil 128 overflows into the rotor shaft inlet 120. The flat-grade oil level 130 may be disposed at the height of the rotor shaft inlet 120 and/or the upper dam face 152. The oil 128 and the rotor dam 160 may not trap the air 158 in the park mechanism cavity 124 when the park unit 100 is at the flat grade. The rotor shaft inlet 120 may be disposed below the rotor dam 160 when the park unit 100 is at the flat grade, such that the rotor dam 160 does not impede the flow of the oil 128.

The park unit 100 may also be configured at the uphill grade (see FIG. 1G). The uphill grade may include, but is not limited to, a 17-degree uphill grade or below. The oil 128 in the sensor cavity 122 may be disposed at the first uphill-grade oil level 132, the oil 128 in the park mechanism cavity 124 may be disposed at the second uphill-grade oil level 134, and/or the oil 128 in the rotor cavity 162 may be disposed at the third uphill-grade oil level 136 when the park unit 100 is configured at the uphill grade. When the park unit

100 pitches to the uphill grade, the oil 128 in the sensor cavity 122 and the park mechanism cavity 124 may move according to gravity. The sensor dam 126 may trap the air 158 within the sensor cavity 122, due to the sensor cavity 122 being unvented. The placement of the sensor dam 126 may trap a large majority of the air 158 in the sensor cavity 122, and establishes the first uphill-grade oil level 132. The air 158 in the sensor cavity 122 may be trapped above the upper dam face 152 by the oil 128. The upper dam face 152 may be disposed below the rotor dam 160 and/or the rotor shaft inlet 120 when the park unit 100 is configured at the uphill grade. The first uphill-grade oil level 132 may be disposed at the upper dam face 152. The air 158 within the park mechanism cavity 124 may also be trapped when the park unit 100 is at the uphill grade. The oil 128 and the rotor dam 160 may trap the air 158 in the park mechanism cavity 124 at the uphill grade. Within the park mechanism cavity 124, the oil 128 cannot enter the sensor cavity 122 due to the air 158 which is trapped not having anywhere to go, so the park mechanism cavity 124 only fills with a small amount of the oil 128, establishing the second uphill-grade oil level 134. The second uphill-grade oil level 134 may be disposed at the rotor dam 160. The rotor dam 160 may be disposed between the upper dam face 152 and the rotor shaft inlet 120 when the park unit 100 is configured at the uphill grade, such that the second uphill-grade oil level 134 may be disposed between the first uphill-grade oil level 132 and the third uphill-grade oil level 136. The air 158 may be trapped in the park mechanism cavity 124 above the rotor dam 160 and/or the second uphill-grade oil level 134. The remainder of the oil 128 flow from the park mechanism cavity 124 to the rotor cavity 162 and exits via the rotor shaft inlet 120. The third uphill-grade oil level 136 may be disposed at the height of the rotor shaft inlet 120. While the volume of the oil 128 over grade change have not been precisely calculated, the levels of the oil 128 in the sensor cavity 122 does not change from the flat grade to the uphill grade. By stabilizing the level of the oil 128 in the sensor cavity 122 by purposefully trapping the air 158, the flow of the oil 128 to the rotor shaft inlet 120 is stable and avoids significant starvation concerns due to the oil 128 moving to the sensor cavity 122. Thus, the sensor dam 126 may be configured to prevent starvation of the oil 128 to the rotor shaft inlet 120 when the park unit 100 pitches to the uphill grade.

It is further contemplated that as the pressure of the oil 128 increases, the height of the oil 128 in the sensor cavity 122 may increase (not depicted) above the sensor dam 126 due to hydrostatics when the park unit 100 is configured at the flat grade and/or the uphill grade.

Figure 1I:
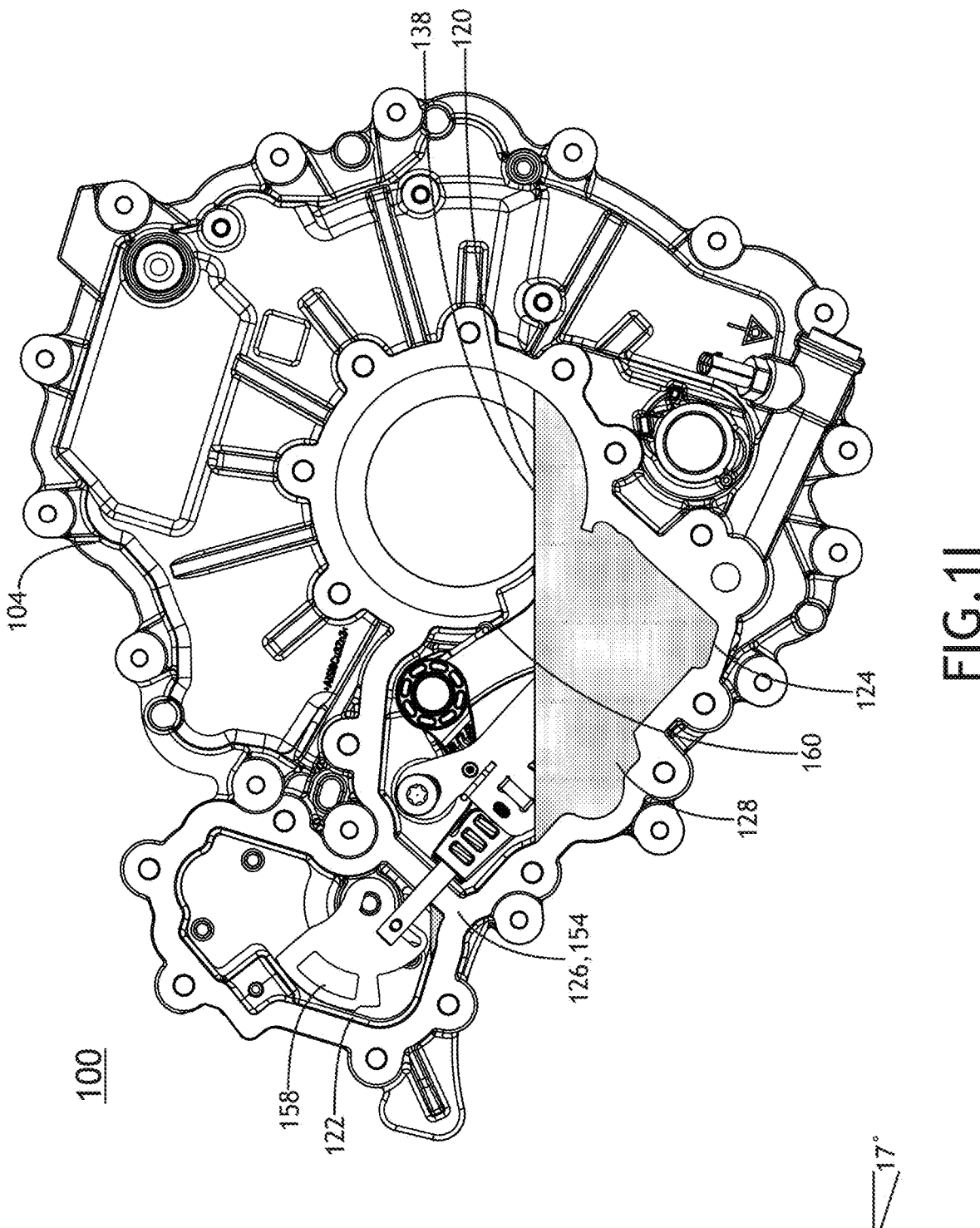
FIG. 1I illustrates a partial front view of the park unit with the cover removed and the oil of the park unit configured at a downhill grade, in accordance with one or more embodiments of the present disclosure.
Figure 1J:
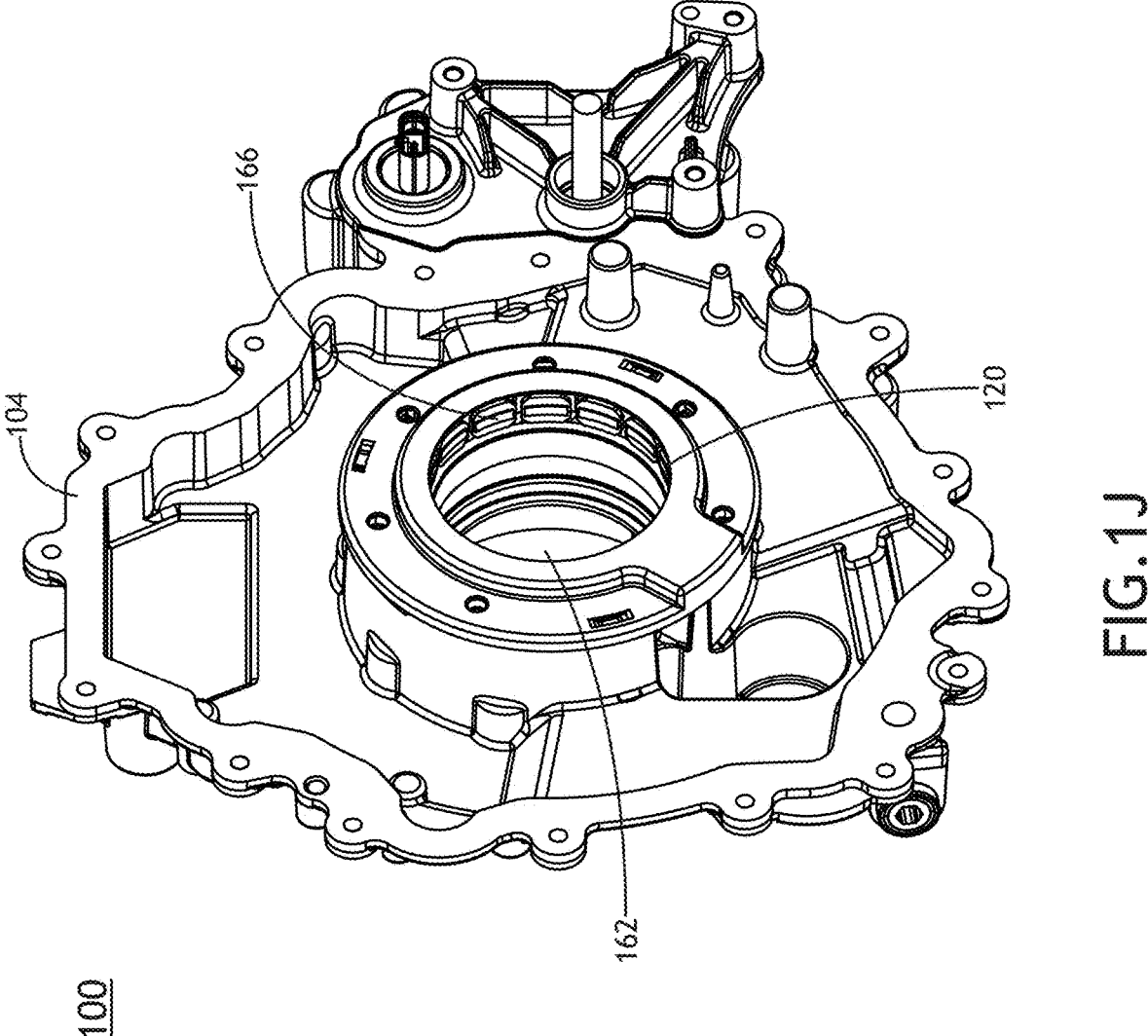
FIG. 1J illustrates a rear perspective view of the park unit with a shaft-sensor stator, in accordance with one or more embodiments of the present disclosure.
Figure 2A:
FIG. 2A illustrates a perspective view of an electric drive unit with the park unit, in accordance with one or more embodiments of the present disclosure.
Figure 2B:
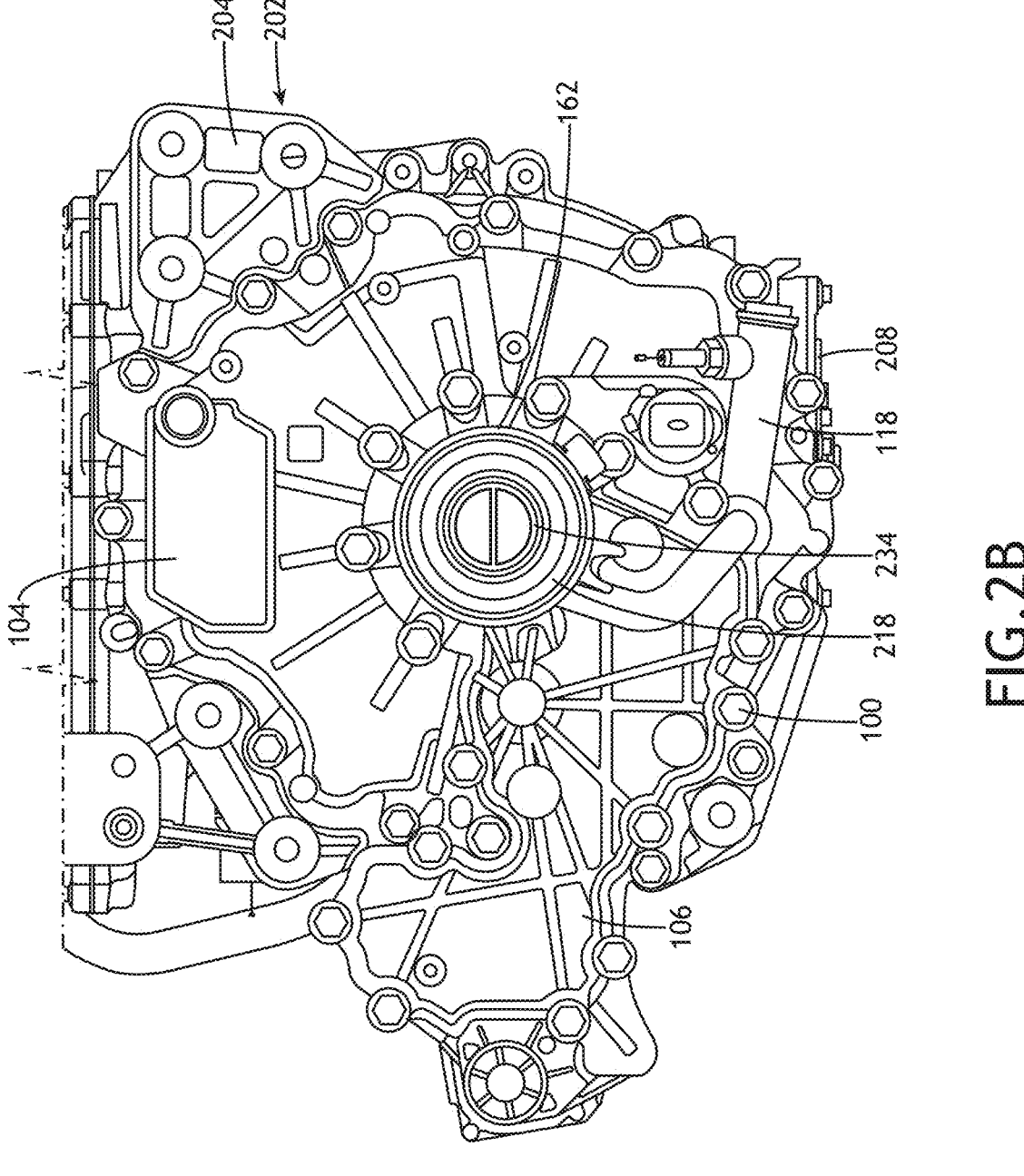
FIG. 2B illustrates a front view of the electric drive unit, in accordance with one or more embodiments of the present disclosure.
Figure 2C:
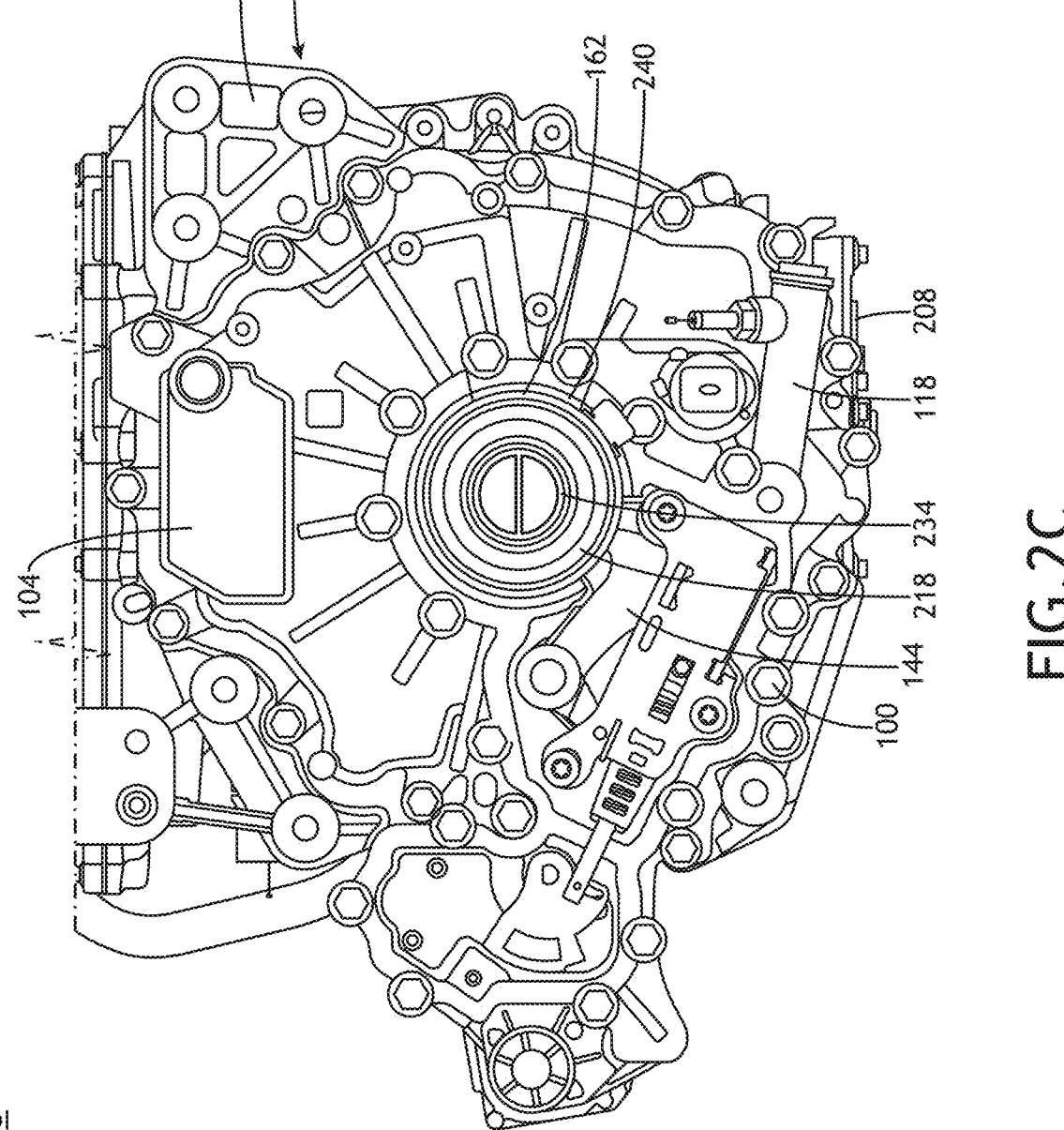
FIG. 2C illustrates a front view of the electric drive unit with the cover hidden, in accordance with one or more embodiments of the present disclosure.
Figure 2D:
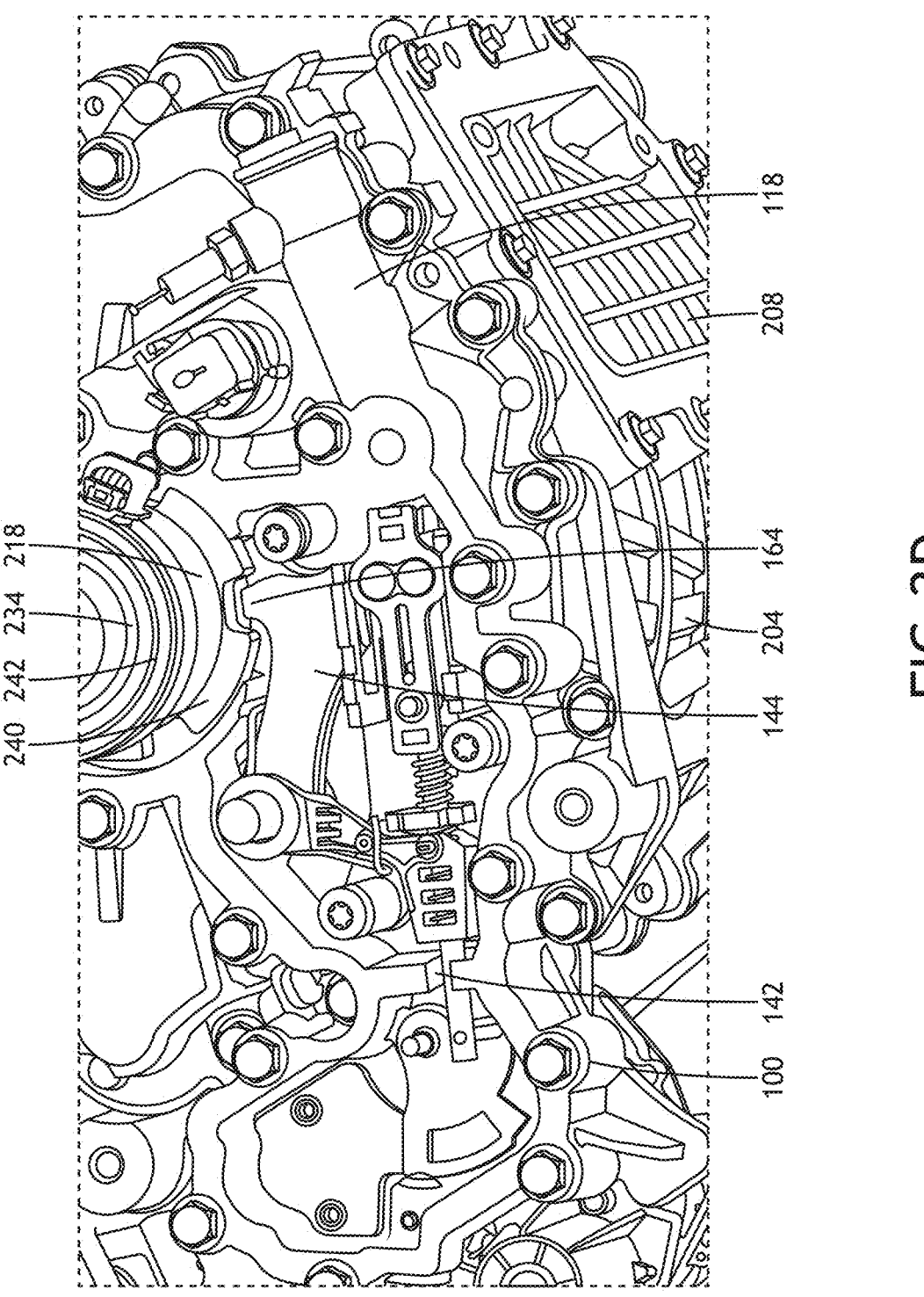
FIG. 2D illustrates depicts a partial front perspective view of the electric drive unit with the cover hidden, in accordance with one or more embodiments of the present disclosure.
Figure 2E:
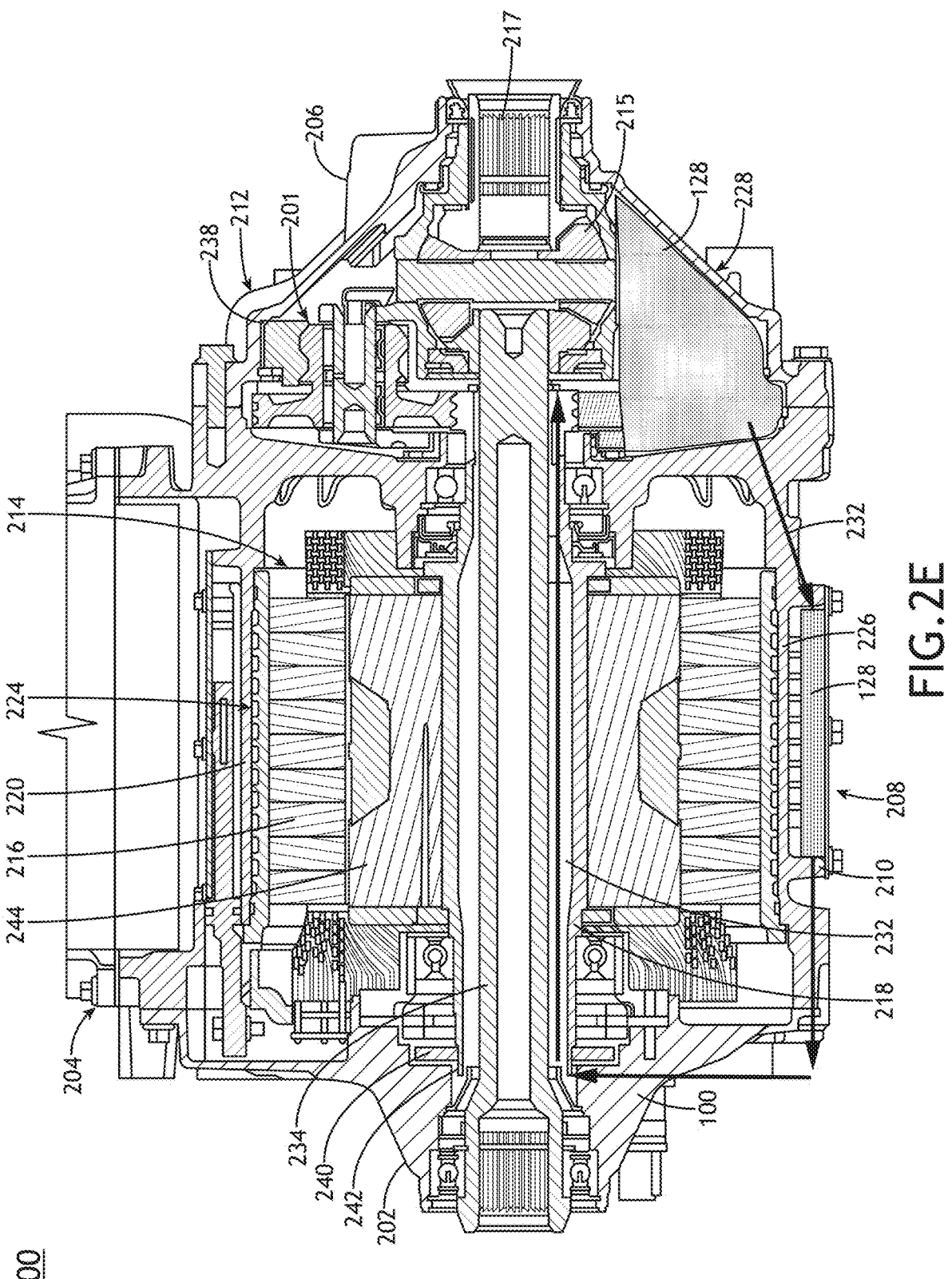
FIG. 2E illustrates a section view of the electric drive unit, in accordance with one or more embodiments of the present disclosure.
Figure 2F:
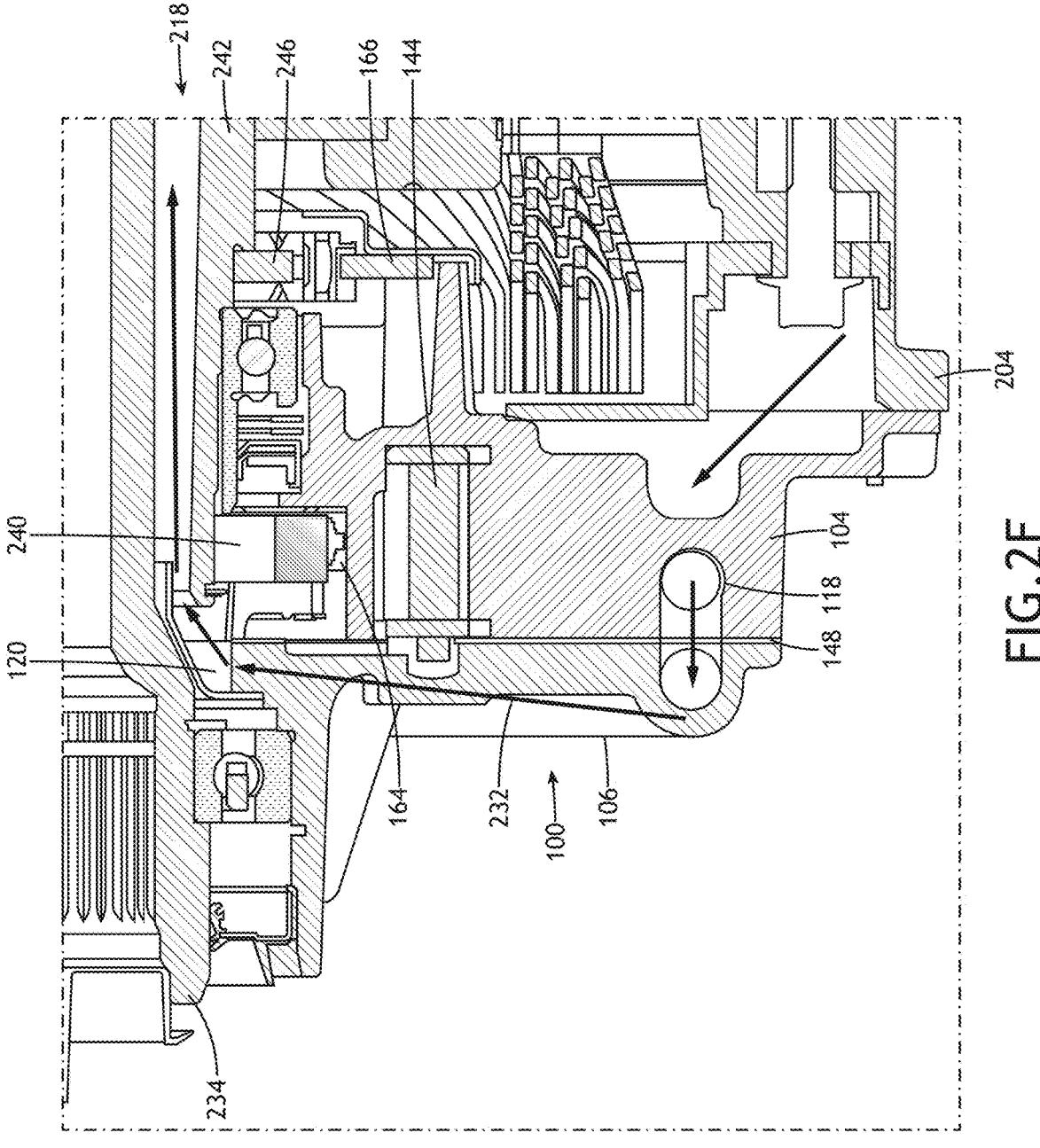
FIG. 2F illustrates a partial section view of the electric drive unit, in accordance with one or more embodiments of the present disclosure.

The park unit 100 may also be configured at the downhill grade (see FIG. 1I). The downhill grade may include, but is not limited to, a 17-degree downhill grade or above. The air 158 may not be trapped in the sensor cavity 122 when the park unit 100 is at the downhill grade. The oil 128 in the park mechanism cavity 124 and/or the rotor cavity 162 may be disposed at the downhill-grade oil level 138 when the park unit 100 is configured at the downhill grade. The downhill-grade oil level 138 may be disposed at the height of the rotor shaft inlet 120. The rotor shaft inlet 120 may be disposed below the lower dam face 154 and/or the rotor dam 160 when the park unit 100 is at the downhill grade. When the park unit 100 pitches to the downhill grade, the oil 128 in the sensor cavity 122 and the park mechanism cavity 124 may move according to gravity. Most of the oil 128 in the sensor cavity 122 may drain out into the park mechanism cavity 124. For example, the oil 128 in the sensor cavity 122 may drain out up to the lower dam face 154. The oil 128 in the park mechanism cavity 124 may also drain into the rotor shaft inlet 120. The oil 128 and the rotor dam 160 may also not trap the air 158 in the park mechanism cavity 124 when the park unit 100 is at the downhill grade. For example, the rotor shaft inlet 120 may be disposed below the rotor dam 160. The downhill grade does not take as much advantage of the park unit 100, mainly just the aspect of limiting initial fill volume, and therefore reduces the amount of oversaturation volume due to high quantity of the oil 128 draining into the rotor shaft inlet 120.

When the park unit 100 returns from the downhill grade to the flat grade, the sensor dam 126 and the oil 128 may trap the air 158 in the sensor cavity 122 above the oil 128. The park unit 100 may have a dwell time to refill the sensor cavity 122 with the oil 128 up to the flat-grade oil level 130 when returning from the downhill grade to the flat grade. The dwell time may be relatively small (e.g., on the order of seconds or below). The small amount of dwell time for the oil 128 to refill the sensor cavity 122 may not impact significantly impact the flow rate of the oil 128 exiting the park unit 100 via the rotor shaft inlet 120.

The end housing 104 may house the shaft-sensor stator 166. The shaft-sensor stator 166 may be disposed radially outwards of and axially aligned with the rotor shaft inlet 120 and/or the rotor cavity 162. The shaft-sensor stator 166 may be concentric to a center axis of the rotor cavity 162. The shaft-sensor stator 166 may be used for sensing a rotary position.

FIGS. 2A-2F depict an electric drive unit 200, in accordance with one or more embodiments of the present disclosure. The electric drive unit 200 ("EDU") may be an electric axle ("e-axle"). The electric drive unit 200 may include the park unit 100.

The electric drive unit 200 may also include one or more other components, such as, but not limited to, a planetary gearset 201, a housing 202, a motor housing 204, a gearbox 206, a heat exchanger 208, a fluid chamber 210, a gearbox housing 212, an electric motor 214, a stator 216, a rotating assembly 218, a stator carrier 220, a stator fluid jacket 224, a fluid chamber bottom wall 226, a gearbox sump 228, a fluid circuit 232, an output shaft 234, a ring gear 238, a park lock gear 240, a rotor shaft 242, a rotor 244, and/or a shaft-sensor rotor 246.

The housing 202 may be a cast aluminum housing. The housing 202 may be formed in multiple parts. The housing 202 can be functionally divided into the motor housing 204, the gearbox housing 212, and/or the end housing 104. The gearbox housing 212 and/or the end housing 104 may be affixed to the motor housing 204 using one or more fasteners.

The gearbox 206 may include the planetary gearset 201, the gearbox housing 212, the gearbox sump 228, and the ring gear 238. The gearbox housing 212 may house the planetary gearset 201. The gearbox housing 212 may define the gearbox sump 228 and the ring gear 238. The ring gear 238 may also be referred to as an annulus. The gearbox sump 228 may be disposed radially outwards of and axially aligned with the planetary gearset 201. A portion of the planetary gearset 201 may radially extend into the gearbox sump 228. The gearbox housing 212 may define the gearbox sump 228. The gearbox sump 228 may be disposed at a bottom of the gearbox 206. The gearbox sump 228 may be a fluid reservoir. The gearbox sump 228 may hold the oil 128. The ring gear 238 may be disposed radially outwards and axially aligned with planet gears of the planetary gearset 201. The planet gears may engage with the ring gear 238.

The heat exchanger 208 may be integrated, or integral with, the motor housing 204. That is, the existing planned casting process for the motor housing 204 may be used to form the heat exchanger 208. The heat exchanger 208 may be located on one or more sides of the electric drive unit 200. The heat exchanger 208 may be disposed radially outwards of the electric motor 214. A fluid chamber 210 of the heat exchanger 208 may be formed in an outer surface (for example, by casting) of the motor housing 204.

The motor housing 204 may house the electric motor 214. The electric motor 214 may be a dynamo-electric machine which converts electrical energy to mechanical energy by electromagnetic means. The electric motor 214 may include the rotating assembly 218, the rotor 244, the stator 216, and/or the stator carrier 220.

The stator 216 may include the stator carrier 220. The stator 216 may be affixed to the motor housing 204. The stator 216 may be disposed radially outwards of and axially aligned with the rotor 244. The stator 216 may be disposed radially inwards of and axially aligned with the heat exchanger 208.

The stator carrier 220 may be a housing for the components of the stator 216. The stator carrier 220 may encapsulate a stator core, a stator winding, and the like. The stator core may be made of stacks of one or more stacks of lamination. The stator core may define one or more slots for the winding. The winding of the stator 216 may disposed in the slots of the stator core.

The rotor 244 may be disposed within a center axis of the stator 216. The rotating assembly 218 may be configured to rotate relative to the stator 216. The magnetic field induced by the stator 216 may cause the rotating assembly 218 to rotate relative to the stator 216. The rotor 244 may magnetically couple with a magnetic field causing the rotating assembly 218 to rotate. Permanent magnets of the rotor 244 may magnetically couple with the magnetic field, causing the rotating assembly 218 to rotate about the center axis.

The rotating assembly 218 may include one or more components, such as, but not limited to, the park lock gear 240, the rotor shaft 242, and/or the rotor 244. The rotating assembly 218 may be configured to rotate about a center axis of the electric drive unit 200. The park lock gear 240, the rotor shaft 242, and/or the rotor 244 may include central axes which are concentric to a center axis of the rotating assembly 218. Each of the park lock gear 240, the rotor shaft 242, and/or the rotor 244 may rotate with the rotating assembly 218 about the center axis. The rotor shaft 242 may be a radially-innermost component of the rotating assembly 218. The park lock gear 240, the rotor 244, and/or the shaft-sensor rotor 246 may be disposed radially outwards of and axially aligned with the rotor shaft 242. The park lock gear 240, the rotor 244, and/or the shaft-sensor rotor 246 may be affixed to and configured to rotate with the rotor shaft 242. Any of the various components may be affixed to the rotor shaft 242 by any suitable technique, such as, but not limited to, a shrink-fit, a press-fit, a keyway, and/or being staked to the rotor shaft 242. Staking may refer to plastically deforming the rotor shaft 242 into said component or vice-versa.

The rotating assembly 218 may be supported by and configured to rotate relative to the stator 216 via a bearing. The rotor 244 may perform work on one or more external components via the rotation of the rotating assembly 218. The rotor shaft 242 may engage to a sun gear of the planetary gearset 201. The electric motor 214 may drive the sun gear of the planetary gearset 201 via the rotor shaft 242.

The rotor shaft 242 may be coupled with the park lock gear 240. The park lock gear 240 may be configured to lock the rotation of the rotating assembly 218 thereby preventing the rotation of the rotating assembly 218 and unlock the rotating assembly 218 thereby allowing the rotation of the rotating assembly 218. The park lock gear 240 may be any suitable type of gear, such as, but not limited to, a ratchet gear. The ratchet gear may also be referred to as a ratchet wheel. The ratchet gear may be a stationary-type ratchet gear.

The park unit 100 may be a parking brake for the rotating assembly 218. The park lock gear 240 may be configured to lock and unlock the rotating assembly 218 to and from the stator 216 via the park lock pawl 144. The park lock gear 240 and the park lock pawl 144 may form a park lock assembly. The park lock pawl 144 may engage with the park lock gear 240. For example, the park lock pawl 144 may include the pawl tooth 164. The pawl tooth 164 may be circumferentially aligned with and disposed radially outwards of the park lock gear 240. The park lock pawl 144 may be configured to translate the pawl tooth 164 radially inwards to engage with the park lock gear 240 and radially outwards to disengage from the park lock gear 240. The engagement of the pawl tooth 164 with park lock gear 240 may lock the park lock gear 240 and the rotating assembly 218 to the stator 216 and/or the housing 202 and prevent rotation relative thereto. The disengagement of the pawl tooth 164 from one of the park lock gear 240 may unlock the park lock gear 240 and the rotating assembly 218 from the stator 216 and/or the housing 202 and allow rotation relative thereto.

The park lock pawl 144 may be configured to receive the pawl tooth 164 for engaging the pawl tooth 164 with the park lock gear 240. The pawl tooth 164 may lock the rotation of the park lock gear 240 about the center axis when the pawl tooth 164 is received by the park lock gear 240. The pawl tooth 164 may prevent the park lock gear 240 from rotating in either direction, so long as the pawl tooth 164 engages with the park lock gear 240. The park mechanism 116 may translate the pawl tooth 164 radially inwards and radially outwards by pivoting and/or rotating the pawl tooth 164.

The shaft-sensor rotor 246 may be axially disposed between the park lock gear 240 and the rotor 244. The shaft-sensor stator 166 may be axially aligned with and disposed radially outwards of the shaft-sensor rotor 246. The shaft-sensor stator 166 may be configured to sense the rotary position of the rotating assembly 218 via the shaft-sensor rotor 246. The shaft-sensor rotor 246 and the shaft-sensor stator 166 may form a shaft-sensor assembly. The shaft-sensor assembly may sense an angular position, a rotational speed, or the like. The shaft-sensor assembly may be a resolver, a variable-reluctance sensor, a hall-effect, an eddy current sensor, or the like.

The electric drive unit 200 may be a coaxial rotor system. The output shaft 234 may be disposed radially inwards of and axially aligned with the rotor shaft 242. The output shaft 234 may be engaged with the rotating assembly 218 via a differential 215 of the planetary gearset 201. The output shaft 234 may axially extend through the rotor shaft 242 and engage with the differential 215. The rotating assembly 218, the output shaft 234, the park lock gear 240, and/or the rotor shaft 242 may be disposed in the rotor cavity 162

The electric drive unit 200 may be utilized in a vehicle, such as an electric vehicle or a hybrid electric vehicle. A pair of wheels of a vehicle's drivetrain may be coupled to opposing ends of the differential 215. For example, the pair of wheels may be coupled to opposing ends of the differential 215 via an internal spline 217 of the differential 215 and via the output shaft 234. The differential 215 may enabling turning the wheels at independent speeds for cornering. Thus, the electric drive unit 200 may be a portion of an electric axle of the vehicle.

The oil 128 may flow in the fluid circuit 232 from the gearbox sump 228, through the heat exchanger 208, through the park unit 100, along the rotor shaft 242, and back to the gearbox sump 228.

The gearbox 206 may collect and distribute the oil 128 from the gearbox sump 228 to the heat exchanger 208. A portion of the pumping action may also be performed via centrifugal pumping.

The heat exchanger 208 may receive and cool the oil 128. The heat exchanger 208 may cool the oil 128 with a coolant fluid that is disposed on the opposing side of the fluid chamber bottom wall 226 within the stator fluid jacket 224. The stator 216 may include a stator fluid jacket 224 formed, and bounded, by the stator carrier 220 and a fluid chamber bottom wall 226 of the fluid chamber 210. The stator fluid jacket 224 may be formed by the stator carrier 220 and the fluid chamber bottom wall 226. The stator carrier 220 and the fluid chamber bottom wall 226 may form an inner wall and an outer wall, respectively, of the stator fluid jacket 224. The stator fluid jacket 224 may be filled with a coolant fluid. The coolant fluid may also be referred to as coolant, antifreeze, or the like. The coolant fluid may include a water-glycol mixture, for example. The coolant fluid may be for cooling of the stator 216 and for cooling the oil 128 that is disposed within the fluid chamber 210 of the heat exchanger 208. The heat exchanger 208 may use the stator fluid jacket 224 to cool the oil 128 within the fluid chamber 210. The fluid chamber bottom wall 226 may be in contact with the stator fluid jacket 224 volume on an inner surface and is in contact with the fluid from the heat exchanger 208 on an outer surface and functions as a "cool wall". The contact may also allow heat exchanging of the oil 128 without added fluid pressure losses or the addition of additional circuits. The cavity defined by the stator fluid jacket 224 can be filled with a water-glycol mixture and the fluid chamber 210 of the heat exchanger 208 can be filled with the oil 128. It is contemplated that a variety of different types of fluids can be utilized within the cavity defined by the stator fluid jacket 224 and the fluid chamber 210.

The oil 128 may be routed from the heat exchanger 208 to the park unit 100. The oil feed passage 118 may receive the oil 128 from the heat exchanger 208. The oil 128 may then flow upwards through the sensor cavity 122 along the fluid circuit 232 to the rotor shaft inlet 120. The oil 128 may include a level which is stable at the rotor shaft inlet 120 when the park unit 100 and the electric drive unit 200 are oriented at the uphill grade, the level grade, and the downhill grade using the sensor dam 126. The rotor shaft inlet 120 and the rotor shaft 242 may thus receive a consistent flow of the oil 128.

The rotor shaft 242 may receive the oil 128 from the park unit 100. The oil 128 may be routed along the fluid circuit 232 to the rotor shaft 242 via the park unit 100 affixed to the housing 202. The park unit 100 is in fluid communication with the rotor shaft 242 such that oil 128 flowing through the park unit 100 exits the rotor shaft inlet 120 into a cavity defined between the rotor shaft 242 and the output shaft 234.

The oil 128 may flow along the inner diameter of the rotor shaft 242 and along the outer diameter of the output shaft 234. The oil 128 may be exposed to both the rotor shaft 242 and the output shaft 234. In the coaxial system, the oil 128 is delivered into a hollow defined by the rotor shaft 242 and the output shaft 234. The oil 128 may provide cooling of the rotor shaft 242. The oil 128 may then return from the end of the rotor shaft 242 to the gearbox sump 228. For example, the oil 128 may return from the end of the rotor shaft 242 via a drilled passage between the motor housing 204 and the planetary gearset 201 and/or a gap between the output shaft 234 and the rotor shaft 242.

The air 158 disposed in the sensor cavity 122, the park mechanism cavity 124, and/or the rotor cavity 162 may also vent to the gearbox sump 228, depending on the grade of the electric drive unit 200 and/or the level of the oil 128 (e.g., the flat-grade oil level 130, the first uphill-grade oil level 132, the second uphill-grade oil level 134, the third uphill-grade oil level 136, and/or the downhill-grade oil level 138).

Referring generally again to the figures. Although much of the present disclosure has described the functions of the park unit 100 and the electric drive unit 200 with reference to the uphill grade and the downhill grade, this is not intended to be limiting. The design of the park unit 100 may be mirrored across the center axis of the rotor cavity 162 from left-to-right and right-to-left, such that the recitations of the park unit 100 in the uphill grade may be replaced by the downhill grade, and vice versa. For example, the sensor dam 126 may manage the level of the oil 128 in the sensor cavity 122 by trapping the air 158 in the sensor cavity 122 at the flat grade and/or the downhill grade and not trap the air 158 in the sensor cavity 122 when the park unit 100 is at the uphill grade. Thus, the oil 128 and the sensor dam 126 may trap the air 158 in the sensor cavity 122 when the park unit is at a flat grade and a first non-flat grade, and the air 158 may not trapped in the sensor cavity 122 when the park unit 100 is at a second non-flat grade, where the first non-flat grade is one of the uphill grade or the downhill grade, and where the second non-flat grade is the other of the uphill grade or the downhill grade.

One skilled in the art will recognize that the herein described components operations, devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components, operations, devices, and objects should not be taken as limiting.

As used herein, the term "axial" and derivatives thereof, such as "axially," shall be understood to refer to a direction along the axis. The term "coaxial" shall be understood to refer to a common axis. Further, the term "radial" and derivatives thereof, such as "radially," shall be understood in relation to the axis. For example, "radially outward" refers to further away from the axis, while "radially inward" refers to nearer to the axis. The term "circumference" or derivatives thereof, such as "circumferentially", may also be defined in reference to the center axis.

As used herein, directional terms such as "top," "bottom," "over," "under," "upper," "upward," "lower," "down," and "downward" are intended to provide relative positions for purposes of description, and are not intended to designate an absolute frame of reference. Various modifications to the described embodiments will be apparent to those with skill in the art, and the general principles defined herein may be applied to other embodiments With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. As such, to the extent any embodiments are described as less desirable than other embodiments or prior art implementations with respect to one or more characteristics, these embodiments are not outside the scope of the disclosure and can be desirable for particular applications.

LIST OF REFERENCE NUMBERS

100 park unit
102 park actuator
104 end housing
106 cover
108 fasteners
110 park sensor
112 park actuator plate
114 manual shaft
116 park mechanism
118 oil feed passage
120 rotor shaft inlet
122 sensor cavity
124 park mechanism cavity
126 sensor dam
128 oil
130 flat-grade oil level
132 first uphill-grade oil level
134 second uphill-grade oil level
136 third uphill-grade oil level
138 downhill-grade oil level
140 actuator rod
142 slot
144 park lock pawl
146 pin
148 gasket
150 inner dam face
152 upper dam face
154 lower dam face
156 cover face
158 air
160 rotor dam
162 rotor cavity
164 pawl tooth
166 shaft-sensor stator
200 electric drive unit
201 planetary gearset
202 housing
204 motor housing
206 gearbox
208 heat exchanger 210 fluid chamber
212 gearbox housing
214 electric motor
215 differential
216 stator
217 internal spline
218 rotating assembly
220 stator carrier
224 stator fluid jacket
226 fluid chamber bottom wall
228 gearbox sump
232 fluid circuit
234 output shaft
238 ring gear
240 park lock gear
242 rotor shaft
244 rotor
246 shaft-sensor rotor

What is claimed:

1. A park unit comprising:
a park actuator;
an end housing;
a cover, wherein the cover seals against the end housing, wherein the end housing and the cover define a sensor cavity, a park mechanism cavity, a sensor dam, and a rotor cavity, wherein the sensor cavity is disposed adjacent to the park mechanism cavity with the sensor dam disposed therebetween, wherein the sensor dam defines a slot, wherein the slot is an only fluid inlet to and fluid outlet from the sensor cavity, wherein the sensor dam is configured to trap air above oil in the sensor cavity, wherein a rotor shaft inlet is disposed within the rotor cavity, wherein the rotor shaft inlet vents the park mechanism cavity; and
a park mechanism comprising an actuator rod and a park lock pawl, wherein the actuator rod is disposed in the sensor cavity, the park mechanism cavity, and the slot, wherein the park lock pawl is disposed in the park mechanism cavity, wherein park actuator is configured to lock and unlock the park mechanism using the actuator rod and the park lock pawl, wherein linear translation of the actuator rod causes the park lock pawl to rotate relative to the end housing thereby locking and unlocking the park mechanism, wherein the oil is configured to flow along the actuator rod between the sensor cavity and the park mechanism cavity.

2. The park unit of claim 1, comprising a park sensor, wherein the park sensor is disposed in the sensor cavity, wherein the park sensor is configured to sense the park mechanism is locked and unlocked.

3. The park unit of claim 1, wherein the slot and the actuator rod form one of a prismatic joint or a cylindrical joint, wherein the park lock pawl and the end housing form a revolute joint in the park mechanism cavity.

4. The park unit of claim 1, comprising a shaft-sensor stator, wherein the shaft-sensor stator is disposed radially outwards of and axially aligned with the rotor shaft inlet.

5. The park unit of claim 1, wherein the sensor dam includes an inner dam face, an upper dam face, and a lower dam face, wherein the cover includes a cover face, wherein the inner dam face, the upper dam face, the lower dam face, and the cover face define the slot, wherein the upper dam face and the lower dam face extend between the inner dam face and the cover face.

6. The park unit of claim 5, wherein the slot does not conform to the actuator rod, wherein the slot is a rectangular slot.

7. The park unit of claim 5, comprising a gasket, wherein the gasket seals between the cover and the end housing, wherein the cover face protrudes through the gasket into the slot.

8. The park unit of claim 1, comprising:
a manual shaft, wherein the park actuator is configured to rotate the manual shaft;
a park actuator plate, wherein the manual shaft is rigidly fixed to the park actuator plate such that rotation of the manual shaft rotates the park actuator plate; and
a pin, wherein the park actuator plate, the manual shaft, and the pin are disposed in the sensor cavity, wherein the pin couples the actuator rod and the park actuator plate, wherein rotation of the park actuator plate translates the actuator rod via the pin, wherein the park actuator is configured to lock and unlock the park mechanism using the manual shaft, the park actuator plate, the pin, the actuator rod, and the park lock pawl.

9. The park unit of claim 8, wherein the park unit is configured to maintain the oil in the sensor cavity below the manual shaft and maintain the oil in the rotor cavity at or above the rotor shaft inlet.

10. The park unit of claim 1, wherein the oil and the sensor dam are configured to trap the air in the sensor cavity when the park unit is at a flat grade and a first non-flat grade, wherein the air is not trapped in the sensor cavity when the park unit is at a second non-flat grade, wherein the first non-flat grade is one of an uphill grade or a downhill grade, wherein the second non-flat grade is the other of the uphill grade or the downhill grade.

11. The park unit of claim 10, wherein the sensor dam includes an upper dam face, wherein the air in the sensor cavity is trapped above the upper dam face by the oil when the park unit is at the flat grade and the first non-flat grade.

12. The park unit of claim 11, wherein the rotor shaft inlet and the upper dam face are aligned at a same height when the park unit is at the flat grade, wherein the upper dam face is disposed below the rotor shaft inlet when the park unit is configured at the first non-flat grade.

13. The park unit of claim 11, wherein the end housing defines a rotor dam, wherein the park mechanism cavity is disposed adjacent to the rotor cavity with the rotor dam disposed therebetween, wherein the oil and the rotor dam are configured to trap the air in the park mechanism cavity when the park unit is at the first non-flat grade, wherein the oil and the rotor dam are not configured to trap the air in the park mechanism cavity when the park unit is at the flat grade and the second non-flat grade.

14. The park unit of claim 13, wherein the rotor dam is disposed above the rotor shaft inlet and the upper dam face when the park unit is at the flat grade, wherein the rotor dam is disposed between the upper dam face and the rotor shaft inlet when the park unit is at the first non-flat grade.

15. The park unit of claim 13, wherein the rotor shaft inlet is disposed below the rotor dam when the park unit is at the flat grade and the second non-flat grade.

16. The park unit of claim 1, wherein the actuator rod is configured to linearly translate into the sensor cavity to unlock the park mechanism and is configured to linearly translate into the park mechanism cavity to lock the park mechanism.

17. The park unit of claim 1, wherein the park lock pawl comprises a pawl tooth, wherein the park mechanism is locked when the pawl tooth is disposed within the rotor cavity and is unlocked when the pawl tooth is disposed within the park mechanism cavity.

18. An electric drive unit comprising:

a park unit comprising:

a park actuator;

an end housing;

a cover, wherein the cover seals against the end housing, wherein the end housing and the cover define a sensor cavity, a park mechanism cavity, a sensor dam, and a rotor cavity, wherein the sensor cavity is disposed adjacent to the park mechanism cavity with the sensor dam disposed therebetween, wherein the sensor dam defines a slot, wherein the slot is an only fluid inlet to and fluid outlet from the sensor cavity, wherein the sensor dam is configured to trap air above oil in the sensor cavity, wherein a rotor shaft inlet is disposed within the rotor cavity, wherein the rotor shaft inlet vents the park mechanism cavity; and a park mechanism comprising an actuator rod and a park lock pawl, wherein the actuator rod is disposed in the sensor cavity, the park mechanism cavity, and the slot, wherein the park lock pawl is disposed in the park mechanism cavity, wherein the park actuator is configured to lock and unlock the park mechanism using the actuator rod and the park lock pawl, wherein linear translation of the actuator rod causes the park lock pawl to rotate relative to the end housing thereby locking and unlocking the park mechanism, wherein the oil is configured to flow along the actuator rod between the sensor cavity and the park mechanism cavity;

a housing comprising a motor housing, wherein the end housing is affixed to the motor housing;

a stator, wherein the stator is affixed to the motor housing; and a rotating assembly, wherein the rotating assembly comprises a park lock gear, a rotor shaft, and a rotor, wherein the park lock gear is configured to lock and unlock the rotating assembly to and from the stator via the park lock pawl.

19. The electric drive unit of claim 18, comprising a heat exchanger, wherein the oil is routed from the heat exchanger to the park unit.

20. The electric drive unit of claim 18, wherein the electric drive unit is a coaxial rotor system, wherein the electric drive unit comprises an output shaft, wherein the output shaft is disposed radially inwards of and axially aligned with the rotor shaft, wherein the oil flowing through the park unit exits the rotor shaft inlet into a cavity defined between the rotor shaft and the output shaft.

* * * * *